US010455635B2

(12) United States Patent
Park et al.

(10) Patent No.: US 10,455,635 B2
(45) Date of Patent: Oct. 22, 2019

(54) METHOD FOR ACTIVATING/DEACTIVATING CELL IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Kijun Kim, Seoul (KR); Joonkui Ahn, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/544,777

(22) PCT Filed: Jan. 20, 2016

(86) PCT No.: PCT/KR2016/000588
§ 371 (c)(1),
(2) Date: Jul. 19, 2017

(87) PCT Pub. No.: WO2016/117928
PCT Pub. Date: Jul. 28, 2016

(65) Prior Publication Data
US 2018/0007731 A1   Jan. 4, 2018

Related U.S. Application Data

(60) Provisional application No. 62/105,723, filed on Jan. 20, 2015.

(51) Int. Cl.
*H04W 76/20* (2018.01)
*H04W 24/08* (2009.01)
(Continued)

(52) U.S. Cl.
CPC ............ *H04W 76/20* (2018.02); *H04L 5/001* (2013.01); *H04L 5/0094* (2013.01);
(Continued)

(58) Field of Classification Search
CPC ..... H04W 76/10; H04W 76/15; H04W 24/18; H04L 5/001; H04L 5/0094
See application file for complete search history.

(56) References Cited

U.S. PATENT DOCUMENTS

2011/0134774 A1    6/2011  Pelletier et al.
2013/0235756 A1*   9/2013  Seo ........................ H04L 1/0026
                                                                370/252

(Continued)

FOREIGN PATENT DOCUMENTS

WO    WO 2014/054892 A1    4/2014
WO    WO 2014/112783 A1    7/2014

OTHER PUBLICATIONS

Alcatel-Lucent, Alcatel-Lucent Shanghai Bell, "Discussion of SeNB SCell Addition/Release", R3-141169, 3GPP TSG RAN WG3 Meeting #84, Seoul, Republic of Korea, May 19-23, 2014, 4 pgs.

*Primary Examiner* — Albert T Chou
(74) *Attorney, Agent, or Firm* — Birch, Stewart, Kolasch & Birch, LLP

(57) ABSTRACT

A cell activation/deactivation method in a wireless communication system and an apparatus therefor are disclosed. Specifically, a method for activating/deactivating a secondary cell (SCell) by a UE in a wireless communication system supporting carrier aggregation includes: receiving an SCell addition related message from an eNB; partially activating one or more first SCell when a partial activation related message for the first SCell from among a plurality of SCells added according to the SCell addition related message is received from the eNB; and fully activating one or more second SCell when a full activation related message for the
(Continued)

second SCell from among the plurality of SCells added according to the SCell addition related message is received from the eNB, wherein normal SCell operations are applied to the second SCell and only some of the normal SCell operations are applied to the first SCell.

13 Claims, 16 Drawing Sheets

(51) Int. Cl.
      *H04W 76/15*       (2018.01)
      *H04L 5/00*       (2006.01)
      *H04W 76/30*       (2018.01)

(52) U.S. Cl.
      CPC ........... *H04W 24/08* (2013.01); *H04W 76/15* (2018.02); *H04L 5/005* (2013.01); *H04W 76/30* (2018.02)

(56) References Cited

U.S. PATENT DOCUMENTS

| | | | |
|---|---|---|---|
| 2014/0092825 A1 | 4/2014 | Boström et al. | |
| 2015/0327107 A1* | 11/2015 | Kim | H04B 7/024 370/252 |
| 2016/0183263 A1* | 6/2016 | Liu | H04W 24/02 370/329 |
| 2017/0070905 A1* | 3/2017 | Li | H04W 24/10 |
| 2017/0294977 A1* | 10/2017 | Uchino | H04W 24/10 |

\* cited by examiner

[FIG. 1]
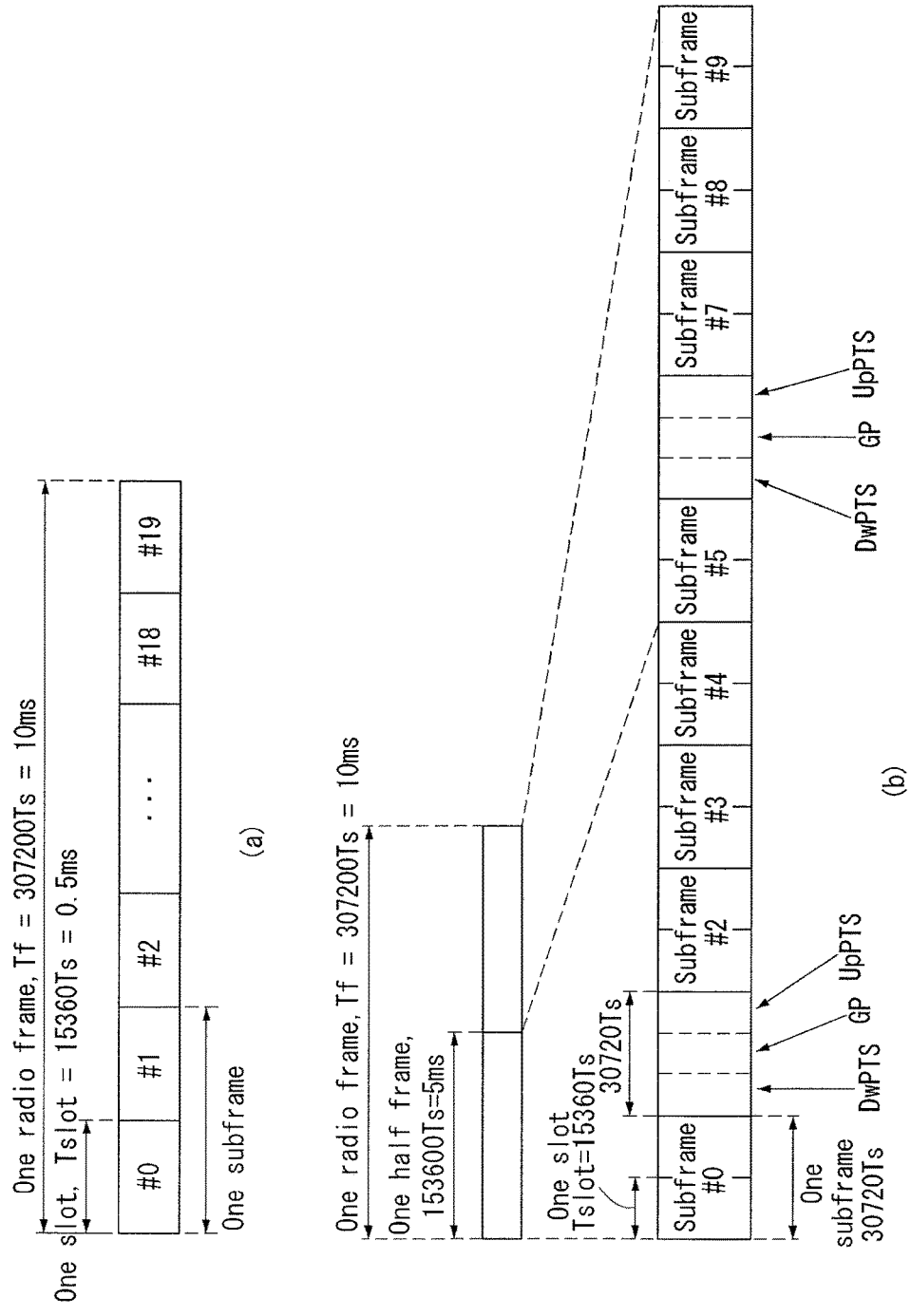

[FIG. 2]
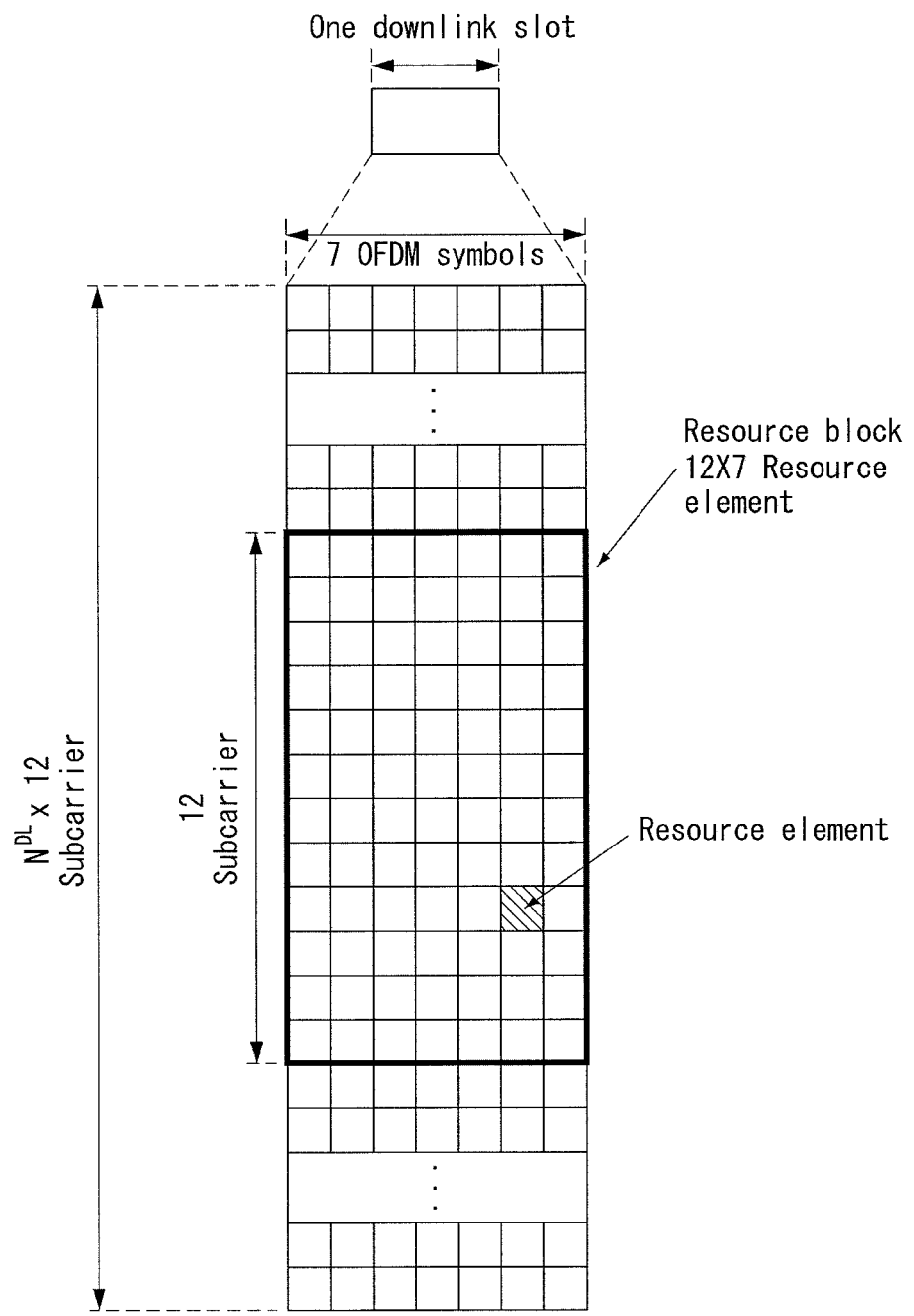

[FIG. 3]
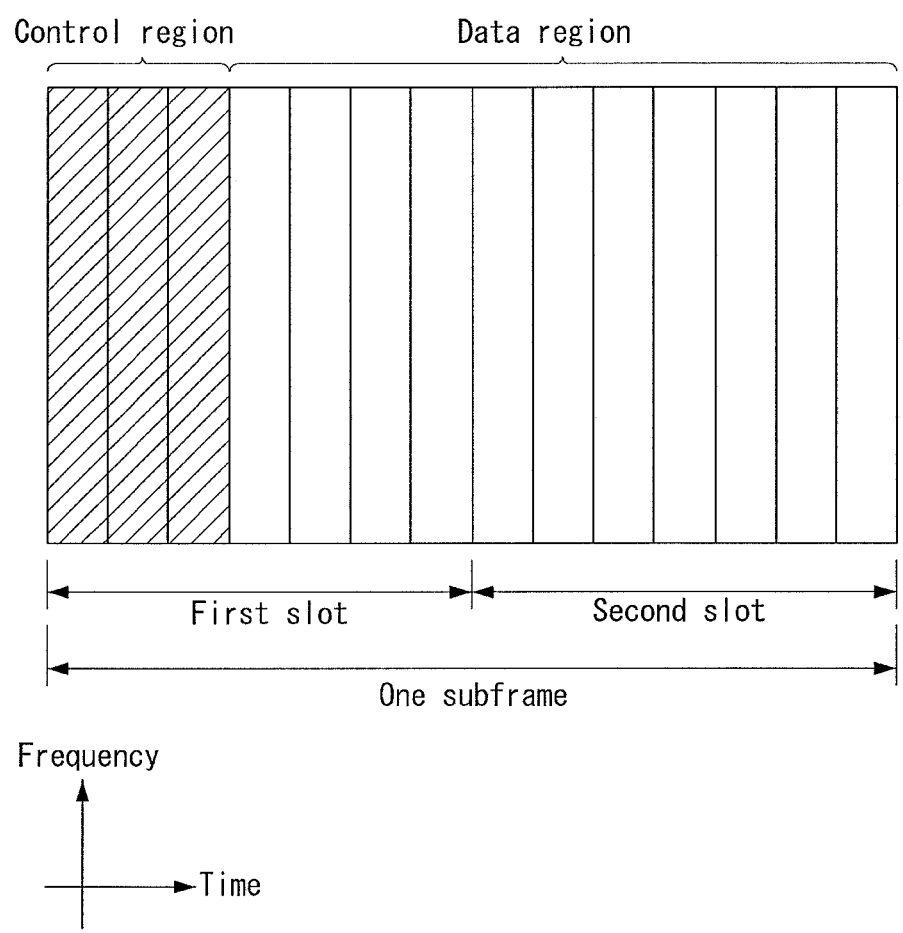

[FIG. 4]
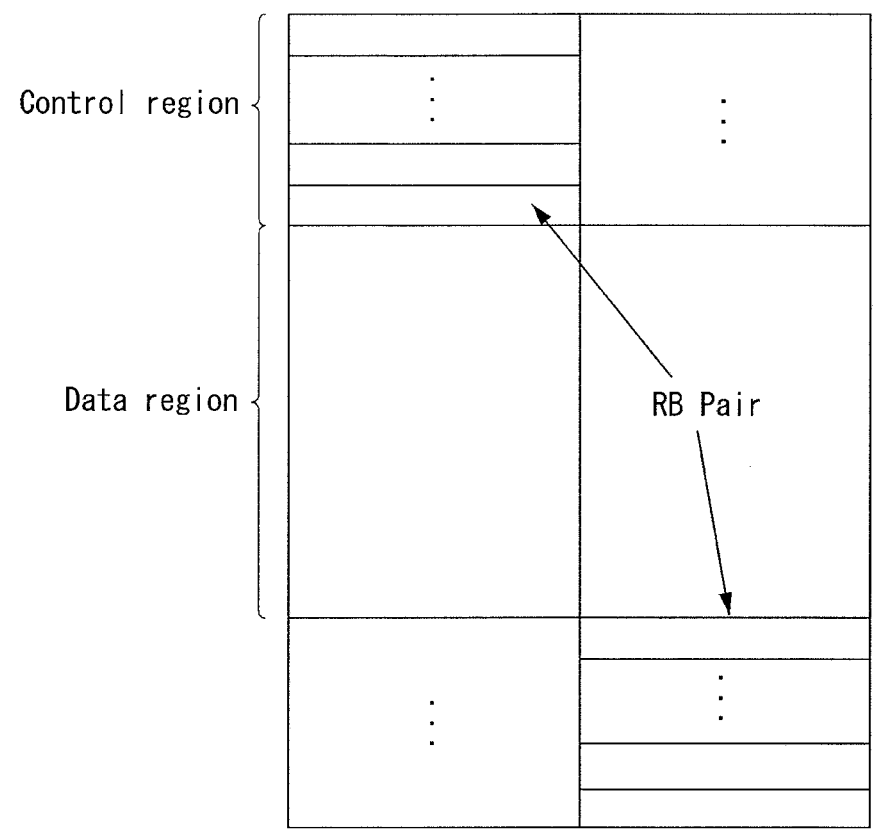
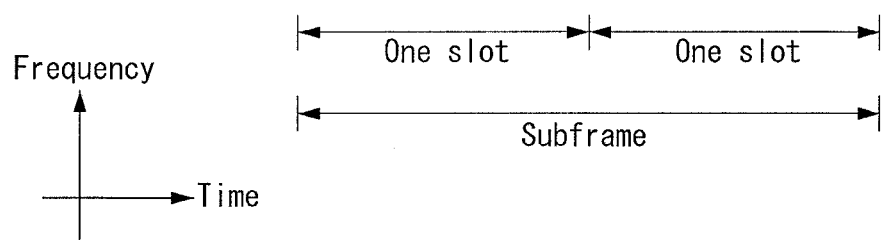

[FIG. 5]
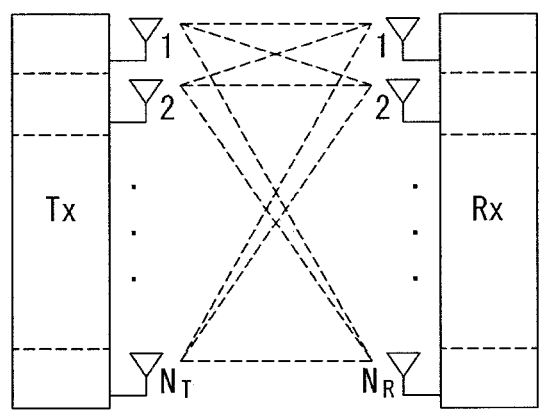
[FIG. 6]
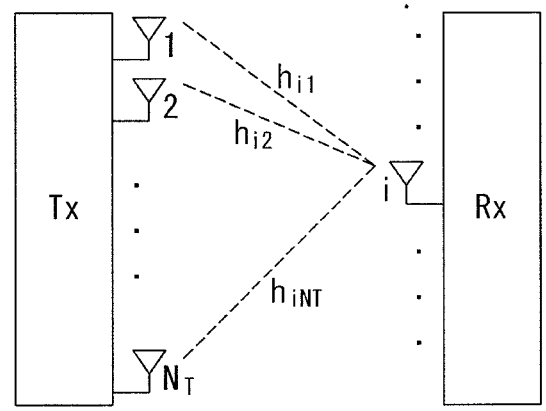

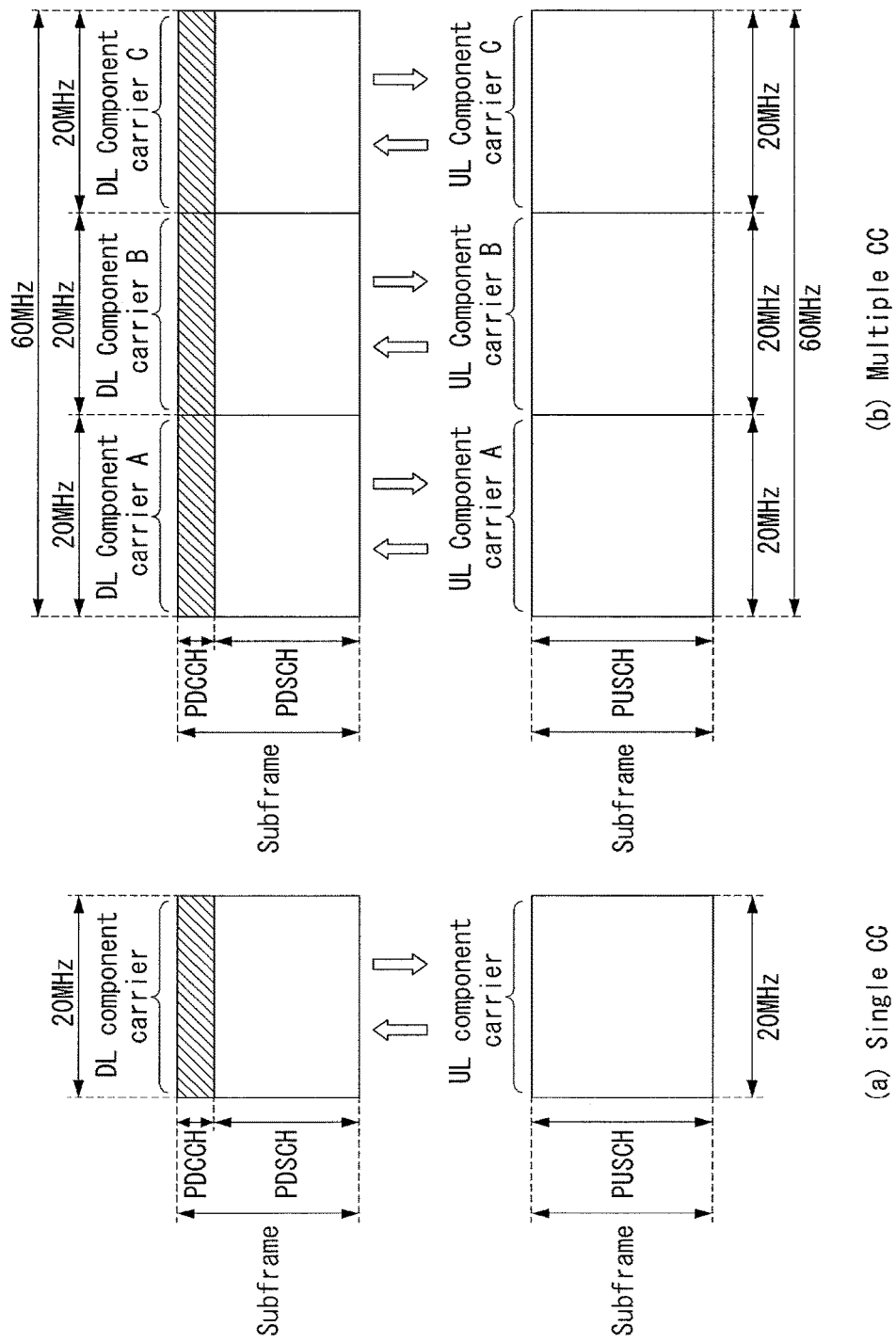
[FIG. 7]

[FIG. 8]
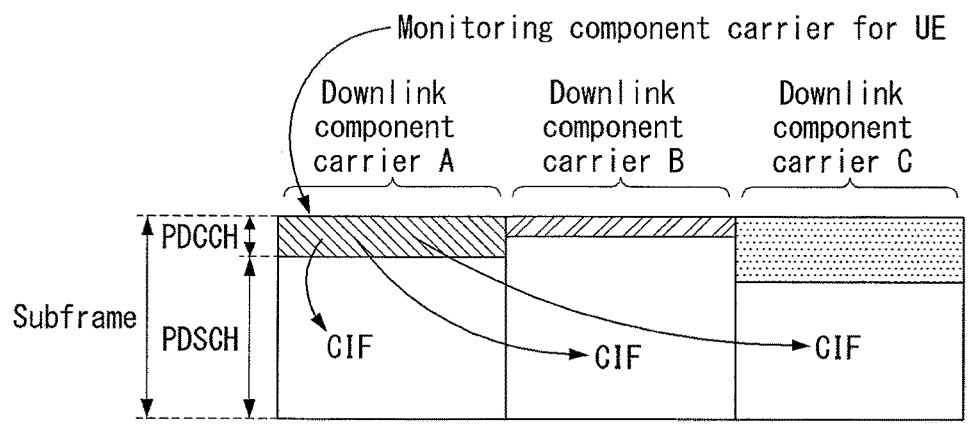
[FIG. 9]
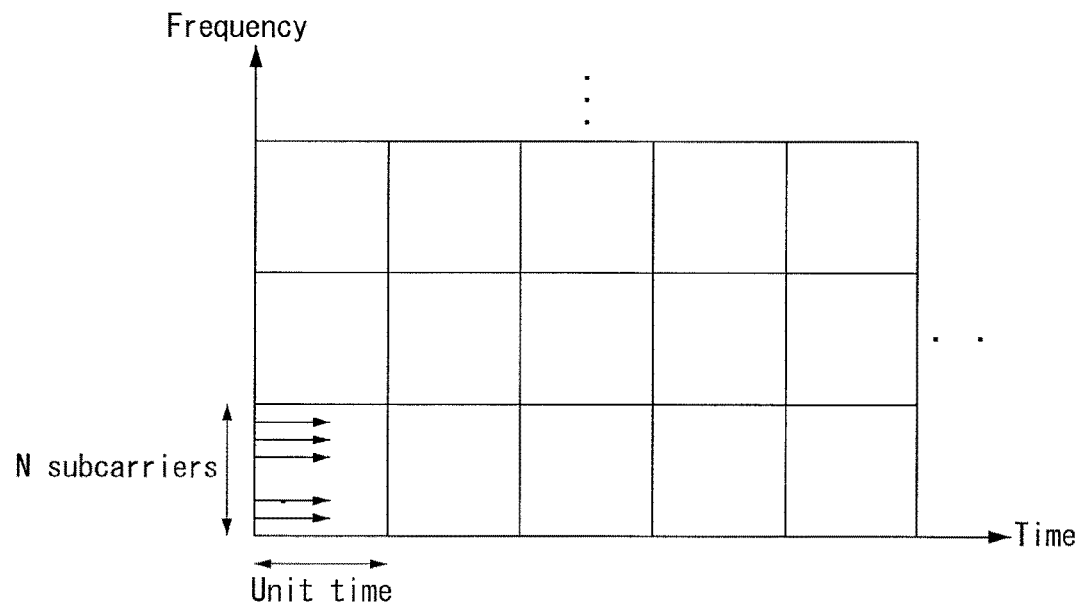

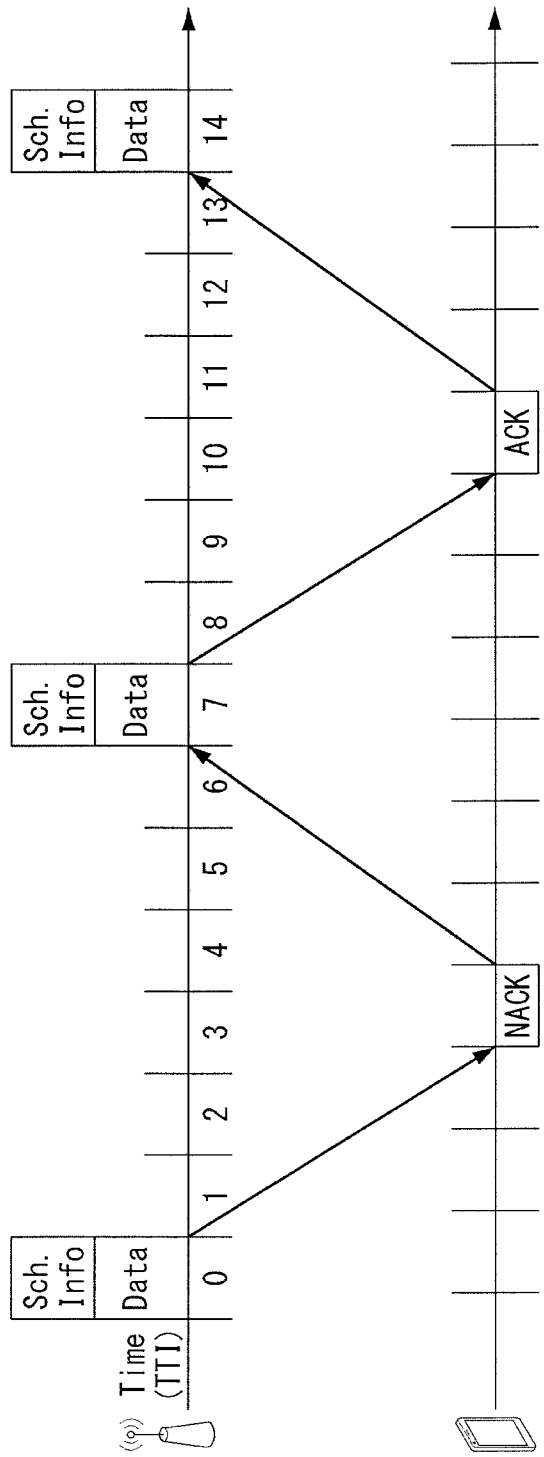
[FIG. 10]

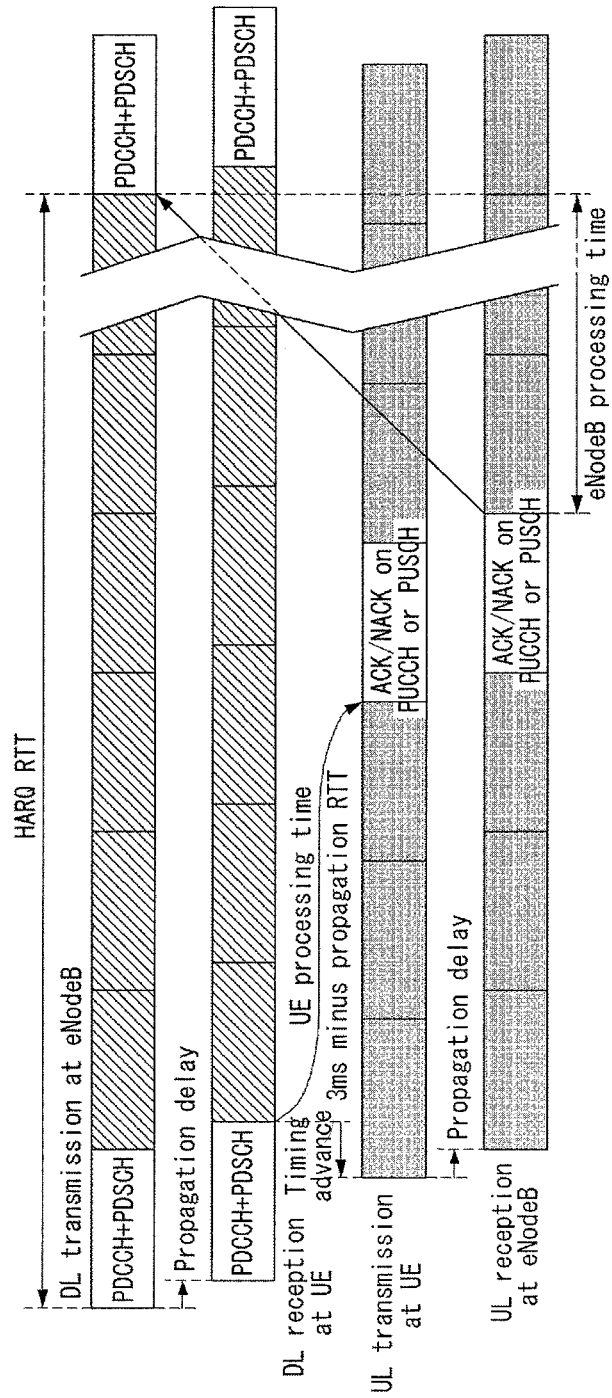
[FIG. 11]

[FIG. 12]
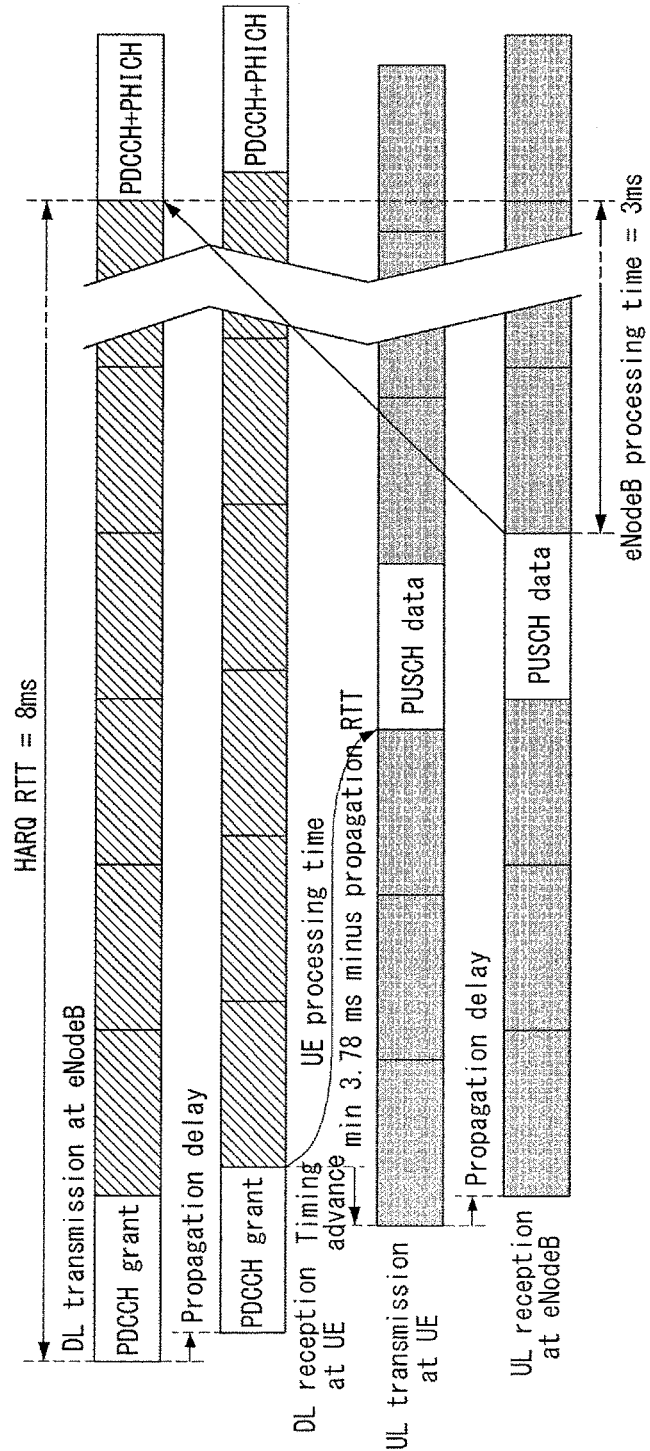

[FIG. 13]
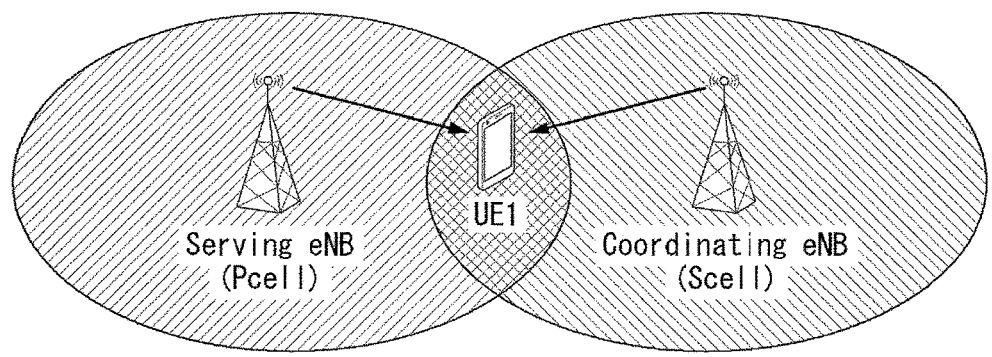
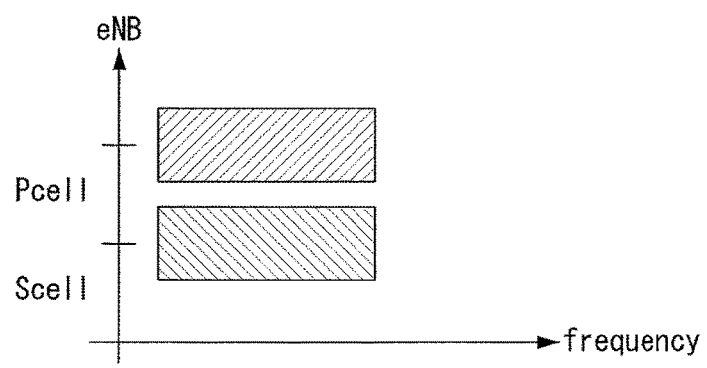

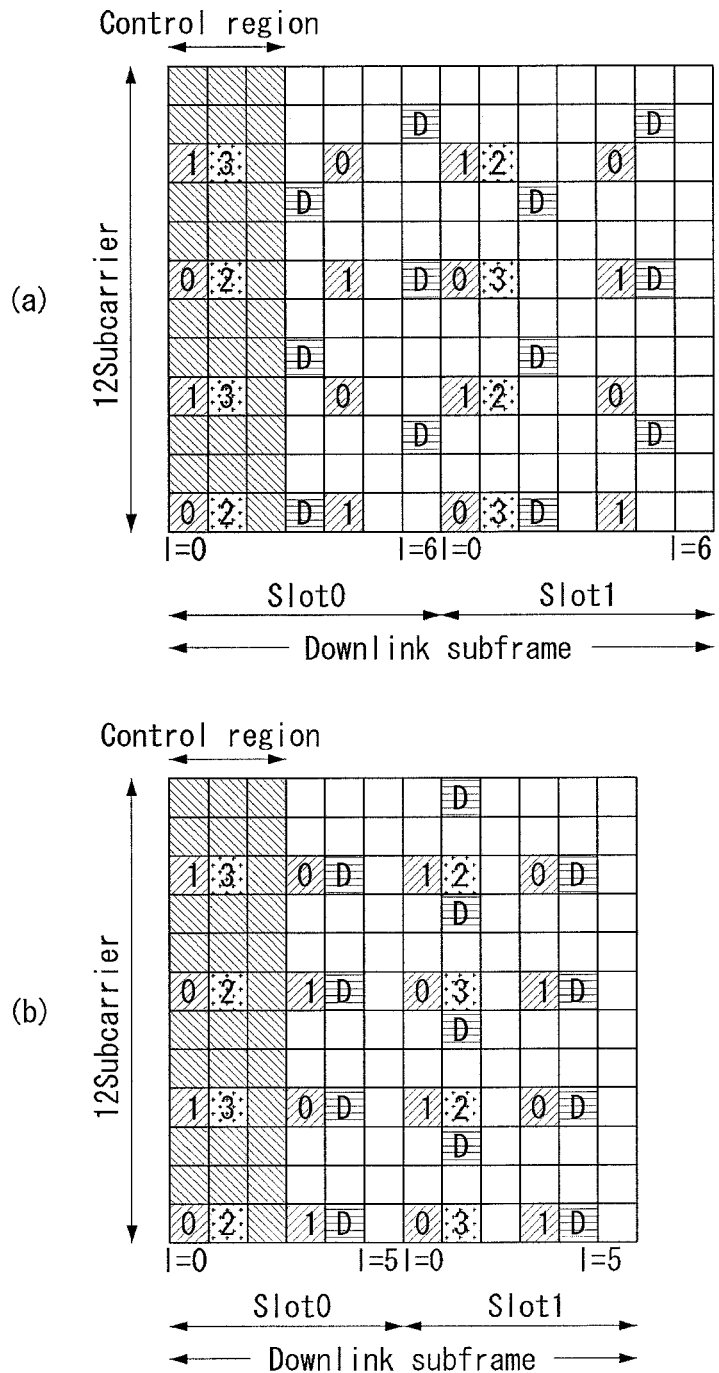
[FIG. 14]

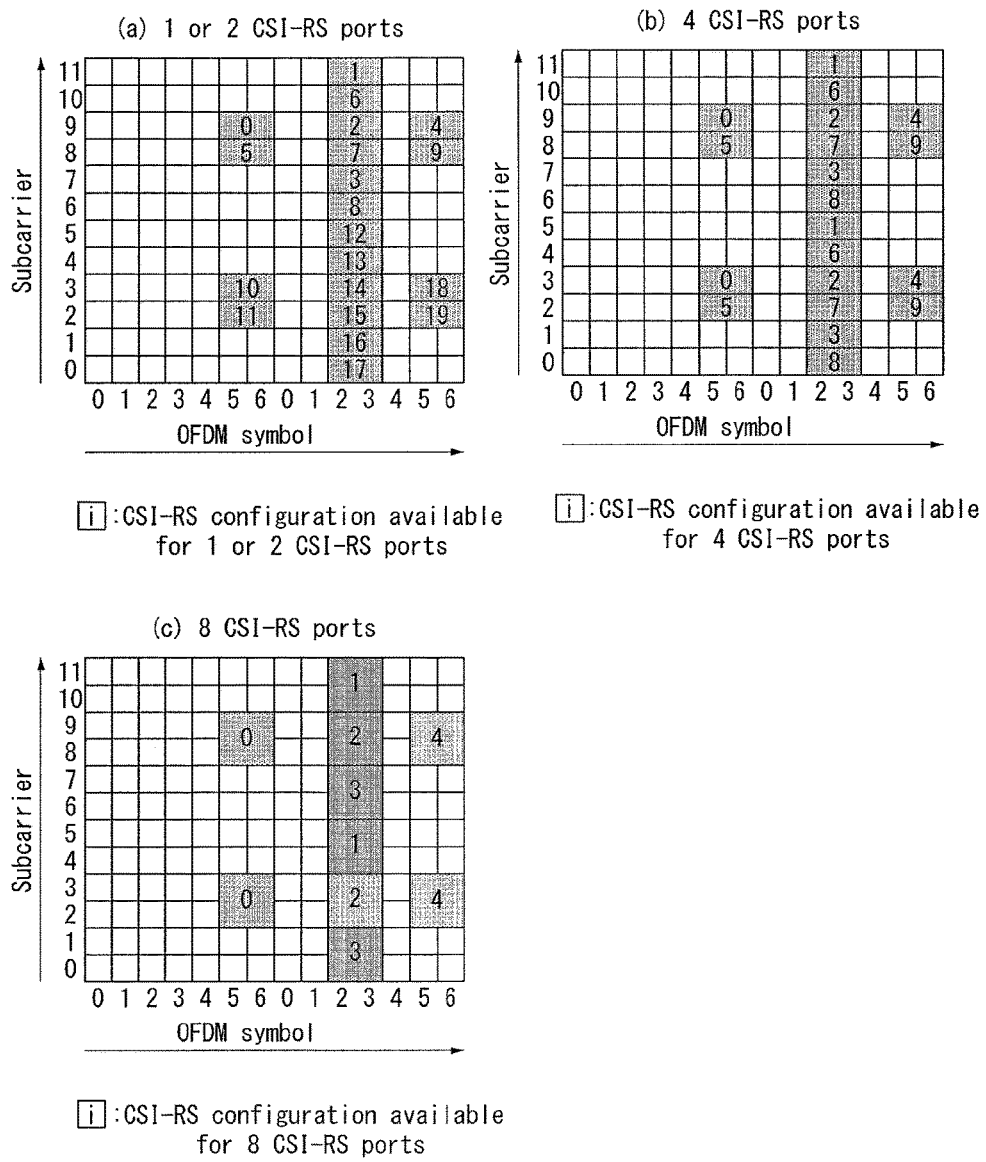

[FIG. 16]
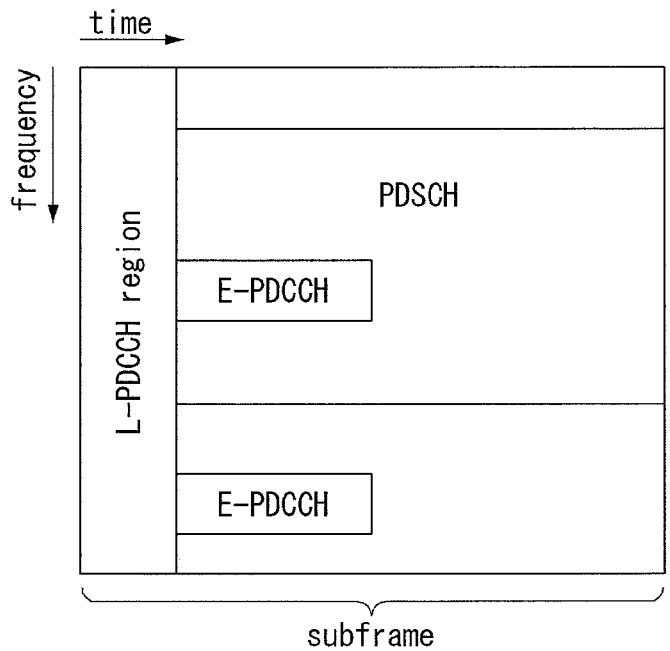
[FIG. 17]
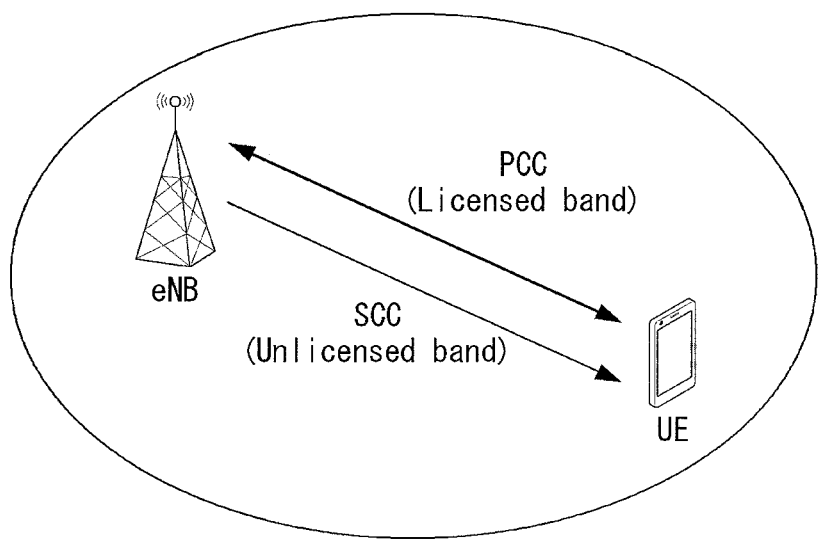

[FIG. 18]
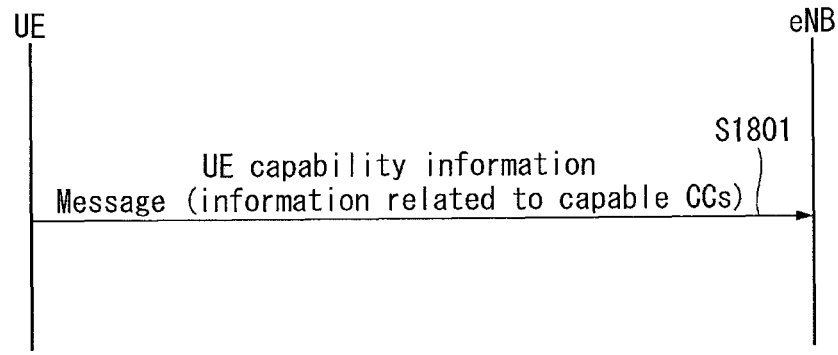
[FIG. 19]
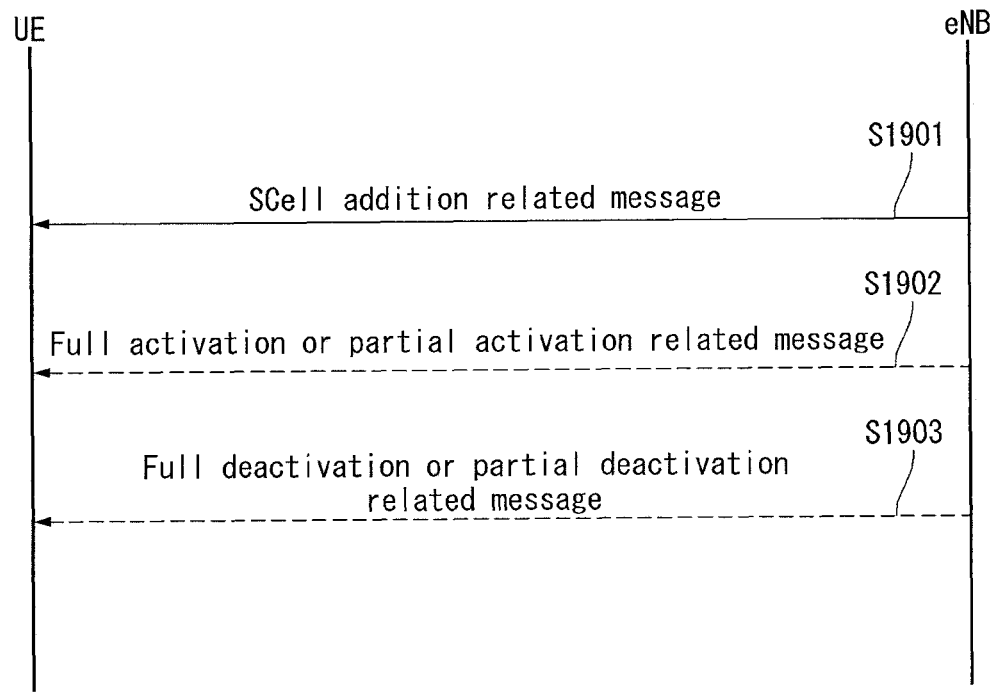

[FIG. 20]
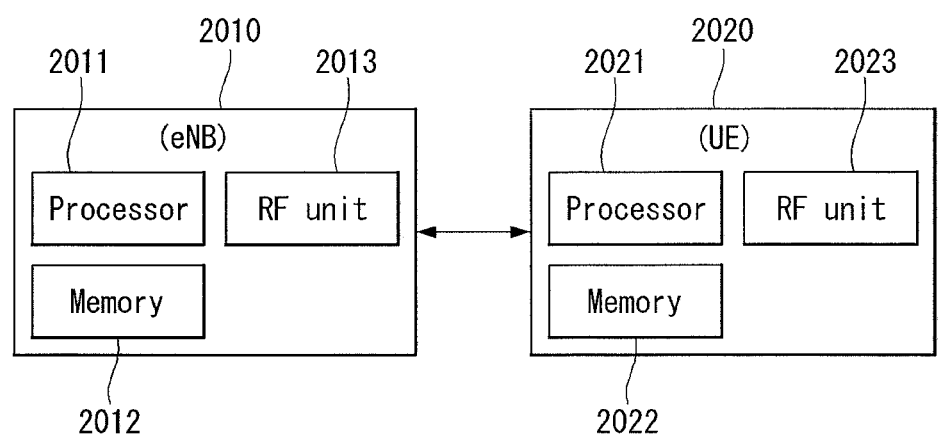

METHOD FOR ACTIVATING/DEACTIVATING CELL IN WIRELESS COMMUNICATION SYSTEM AND DEVICE THEREFOR

CROSS REFERENCE TO RELATED APPLICATIONS

This application is the National Phase of PCT International Application No. PCT/KR2016/000588, filed on Jan. 20, 2016, which claims priority under 35 U.S.C. 119(e) to U.S. Provisional Application No. 62/105,723, filed on Jan. 20, 2015, all of which are hereby expressly incorporated by reference into the present application.

TECHNICAL FIELD

The present invention relates to a wireless communication system, and more specifically, to a method for activating/deactivating a cell to support fast carrier switching and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present invention is to provide a method for full activation and partial activation of a secondary cell.

Another object of the present invention is to provide a method for performing channel state information measurement and/or radio resource monitoring measurement in a partially activated secondary cell.

Technical objects to be achieved by the present invention are not limited to the aforementioned objects, and those skilled in the art to which the present invention pertains may evidently understand other technical objects from the following description.

Technical Solution

In an aspect of the present invention, a method for activating/deactivating a secondary cell (SCell) by a UE in a wireless communication system supporting carrier aggregation includes: receiving an SCell addition related message from an eNB; partially activating one or more first SCell when a partial activation related message for the first SCell from among a plurality of SCells added according to the SCell addition related message is received from the eNB; and fully activating one or more second SCell when a full activation related message for the second SCell from among the plurality of SCells added according to the SCell addition related message is received from the eNB, wherein normal SCell operations are applied to the second SCell and only some of the normal SCell operations are applied to the first SCell.

In another aspect of the present invention, a UE for activating/deactivating a secondary cell (SCell) in a wireless communication system supporting carrier aggregation includes: a radio frequency (RF) unit for transmitting and receiving radio signals; and a processor for controlling the RF unit, wherein the processor is configured: to receive an SCell addition related message from an eNB; to partially activate one or more first SCell when a partial activation related message for the first SCell from among a plurality of SCells added according to the SCell addition related message is received from the eNB; and to fully activate one or more second SCell when a full activation related message for the second SCell from among the plurality of SCells added according to the SCell addition related message is received from the eNB, wherein normal SCell operations are applied to the second SCell and only some of the normal SCell operations are applied to the first SCell.

Preferably, channel state information (CSI) measurement and/or radio resource management (RRM) measurement may be applied to the first SCell.

Preferably, a measurement gap for the CSI measurement may be configured.

Preferably, a measurement gap for periodic CSI measurement may be implicitly configured in association with a subframe of a reference signal for the CSI measurement, a subframe of a CSI-interference measurement (CSI-IM) resource and/or a CSI reporting subframe.

Preferably, a measurement gap for aperiodic CSI measurement may be implicitly configured in association with a subframe in which downlink control information (DCI) including triggering for aperiodic CSI measurement is transmitted.

Preferably, when the measurement gap does not include a reference signal or a CSI-IM resource for the CSI measurement, a subframe of a reference signal or a subframe of a CSI-IM resource for previous CSI measurement may be used as the reference resource for the CSI measurement.

Preferably, when the measurement gap does not include a reference signal or a CSI-IM resource for the CSI measurement, an OOR (out-of-range) may be transmitted to the eNB when CSI reporting is performed.

Preferably, the plurality of SCells may be initially deactivated or partially activated when added.

Preferably, the second SCell may have been partially activated before the full activation related message for the second SCell is received.

Preferably, the method may further include partially activating the second SCell when a partial activation related message or a partial deactivation related message for the second SCell is received from the eNB.

Preferably, the method may further include deactivating the first SCell or the second SCell when an SCell deactivation or full deactivation related message for the first SCell or the second SCell is received from the eNB.

Preferably, the method may further include transmitting, to the eNB, a capability related message including the number of component carriers (CCs) that can be simultaneously partially activated by the UE, a list of the CCs, and the number of CCs that can be fully activated in the list.

Preferably, the second SCell may be included in the first SCell.

Preferably, a common periodic CSI reporting mode and/or a common report resource may be configured for some of the plurality of added SCells.

Advantageous Effects

According to embodiments of the present invention, partial activation and full activation states can be defined to improve resource usage efficiency.

In addition, according to embodiments of the present invention, channel state information/radio resource management measurement and reporting are performed in a partially activated cell to enable effective fast carrier switching.

Advantages which may be obtained by the present invention are not limited to the aforementioned advantages, and various other advantages may be evidently understood by those skilled in the art to which the present invention pertains from the following description.

DESCRIPTION OF DRAWINGS

The accompanying drawings, which are included herein as a part of a description in order to help understanding of the present invention, provide embodiments of the present invention, and describe the technical features of the present invention with the description below.

FIG. 1 illustrates the structure of a radio frame in a wireless communication system to which an embodiment of the present invention may be applied.

FIG. 2 is a diagram illustrating a resource grid for a downlink slot in a wireless communication system to which an embodiment of the present invention may be applied.

FIG. 3 illustrates the structure of a downlink subframe in a wireless communication system to which an embodiment of the present invention may be applied.

FIG. 4 illustrates the structure of an uplink subframe in a wireless communication system to which an embodiment of the present invention may be applied.

FIG. 5 shows the configuration of a known MIMO communication system.

FIG. 6 is a diagram showing a channel from a plurality of transmission antennas to a single reception antenna.

FIG. 7 shows an example of component carriers and a carrier aggregation in a wireless communication system to which an embodiment of the present invention may be applied.

FIG. 8 shows an example of the structure of a subframe according to cross-carrier scheduling in a wireless communication system to which an embodiment of the present invention may be applied.

FIG. 9 is a diagram illustrating a time-frequency resource block in a time frequency domain in a wireless communication system to which an embodiment of the present invention may be applied.

FIG. 10 is a diagram illustrating a resource allocation and retransmission process of an asynchronous HARQ method in a wireless communication system to which an embodiment of the present invention may be applied.

FIG. 11 is a diagram showing a downlink HARQ process in an LTE FDD system to which an embodiment of the present invention may be applied.

FIG. 12 is a diagram showing an uplink HARQ process in an LTE FDD system to which an embodiment of the present invention may be applied.

FIG. 13 is a diagram illustrating a carrier aggregation-based CoMP system in a wireless communication system to which an embodiment of the present invention may be applied.

FIG. 14 illustrates a reference signal pattern mapped to a downlink resource block pair in a wireless communication system to which an embodiment of the present invention may be applied.

FIG. 15 illustrates CSI-RS configurations in a wireless communication system to which the present invention is applicable.

FIG. 16 illustrates a PDCCH and an E-PDCCH in a wireless communication system to which the present invention is applicable.

FIG. 17 illustrates carrier aggregation in an unlicensed band according to an embodiment of the present invention.

FIGS. 18 and 19 illustrate a cell activation/deactivation method according to an embodiment of the present invention.

FIG. 20 is a block diagram of wireless communication devices according to an embodiment of the present invention.

BEST MODE

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot 2i and a slot 2i+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of $153600*T\_s=5$ ms. Each half frame includes 5 subframes, each having a length of $30720*T\_s=1$ ms.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having $T\_slot=15360*T\_s=0.5$ ms length.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a physical downlink control channel (PDCCH) like other scheduling information. Configuration information may be transmitted to all pieces of UE within a cell through a broadcast channel as broadcasting information.

Table 2 shows the configuration (the length of a DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some consecutive CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s=[s_1,s_2,\ldots,s_{N_T}]^T \quad \text{[Equation 2]}$$

Transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector having controlled transmission power in Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y=[y_1,y_2,\ldots,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\ldots,h_{iN_T}] \quad \text{[Equation 7]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel after the actual channel experiences the channel matrix H. Accordingly, AWGN n_1, n_2, ..., n_NR added to the N_R reception antennas, respectively, are represented using a vector as follows.

$$n=[n_1,n_2,\ldots,n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_T} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \qquad \text{[Equation 11]}$$

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

General Carrier Aggregation

A communication environment taken into consideration in embodiments of the present invention includes a multi-carrier support environment. That is, a multi-carrier system or carrier aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between consecutive carriers and an aggregation between inconsecutive (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a primary cell (PCell) and a secondary cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or a primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An evolved universal terrestrial radio access network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfiguration) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a primary component carrier (PCC) may be used as the same meaning as a PCell, and a secondary component carrier (SCC) may be used as the same meaning as an SCell.

FIG. 7 shows an example of component carriers and a carrier aggregation in a wireless communication system to which an embodiment of the present invention may be applied.

FIG. 7(a) shows the structure of a single carrier used in an LTE system. A CC includes a DL CC and an UL CC. One component carrier may have a frequency range of 20 MHz.

FIG. 7(b) shows the structure of a carrier aggregation used in an LTE-A system. FIG. 7(b) shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to the UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by system information block type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

When one or more SCells are configured in UE, a network may activate or deactivate the configured SCell(s). A PCell is always activated. The network activates or deactivates the SCell(s) by transmitting an activation/deactivation MAC control element.

The activation/deactivation MAC control element has a fixed size and consists of a single octet including 7 C-fields and 1 R-field. The C-field is configured for each SCell index (SCellIndex) and is indicative of the activation/deactivation of the SCell. When the value of the C-field is set to "1", it indicates the activation of an SCell having the index of the corresponding SCell. When the value of the C-field is set to "0", it indicates the deactivation of an SCell having the index of the corresponding SCell.

Furthermore, the UE maintains a timer (sCellDeactivationTimer) for each configured SCell and deactivates a related SCell when the timer expires. The same initial timer value is applied to each instance of the timer (sCellDeactivationTimer) and configured by RRC signaling. When an SCell(s) is added or after handover, an initial SCell(s) has been deactivated.

UE performs the following operation on each configured SCell(s) in each TTI.

When the UE receives an activation/deactivation MAC control element that activates an SCell in a specific TTI (subframe n), the UE activates an SCell in a TTI (a subframe n+8 or thereafter) corresponding to predetermined timing, and (re)starts a timer related to the corresponding SCell. The activation of the SCell by the UE means that the UE applies common SCell operations, such as the transmission of a sounding reference signal (SRS) on the SCell, the report of a channel quality indicator (CQI)/precoding matrix indicator (PMI)/rank indication (RI)/precoding type indicator (PTI) for the SCell, PDCCH monitoring on the SCell, and PDCCH monitoring for the SCell.

When the UE receives an activation/deactivation MAC control element that deactivates the SCell in a specific TTI (subframe n) or a timer related to the activated SCell in a specific TTI (subframe n) expires, the UE deactivates the SCell in a TTI (subframe n+8 or thereafter) corresponding to predetermined timing, stops the timer of the corresponding SCell, and flushes the entire HARQ buffer related to the corresponding SCell.

When a PDCCH on the activated SCell is indicative of an uplink grant or downlink assignment or when a PDCCH on a serving cell that schedules the activated SCell is indicative of an uplink grant or downlink assignment for the activated SCell, the UE restarts a timer related to the corresponding SCell.

When the SCell is deactivated, the UE does not transmit an SRS on an SCell, does not report a CQI/PMI/RI/PTI for an SCell, and does not transmit an UL-SCH on an SCell, and does not monitor a PDCCH on an SCell.

Cross-Carrier Scheduling

In a carrier aggregation system, there are two types of a self-scheduling method and a cross-carrier scheduling method from a viewpoint of scheduling for a carrier or serving cell. Cross-carrier scheduling may be called cross component carrier scheduling or cross cell scheduling.

Cross-carrier scheduling means that a PDCCH (DL grant) and a PDSCH are transmitted on different DL CCs or that a PUSCH transmitted according to a PDCCH (UL grant) transmitted in a DL CC is transmitted on an UL CC different from an UL CC link to a DL CC on which the UL grant has been received.

Whether cross-carrier scheduling is to be performed may be activated or deactivated in a UE-specific manner, and each piece of UE may be semi-statically notified of whether cross-carrier scheduling is to be performed through higher layer signaling (e.g., RRC signaling).

If cross-carrier scheduling is activated, there is a need for a carrier indicator field (CIF), providing notification that a PDSCH/PUSCH indicated by a corresponding PDCCH is transmitted through which DL/UL CC, in a PDCCH. For example, a PDCCH may allocate a PDSCH resource or a PUSCH resource to any one of a plurality of CCs using a CI. That is, a CIF is set if a PDCCH on a DL CC allocates a PDSCH or PUSCH resource on one of multiple DL/UL CCs which have been aggregated. In this case, the DCI format of LTE-A Release-8 may be extended according to the CIF. In this case, the set CIF may be fixed to a 3-bit field and the position of the set CIF may be fixed regardless of the size of the DCI format. Furthermore, the PDCCH structure (the same coding and the same CCE-based resource mapping) of LTE-A Release-8 may be reused.

In contrast, if a PDCCH on a DL CC allocates a PDSCH resource on the same DL CC or allocates a PUSCH resource on one linked UL CC, a CIF is not set. In this case, the same PDCCH structure (the same coding and the same CCE-based resource mapping) and DCI format as those of LTE-A Release-8 may be used.

If cross-carrier scheduling is possible, UE needs to monitor a PDCCH for a plurality of DCIs in the control region of a monitoring CC depending on the transmission mode and/or bandwidth of each CC. Accordingly, there is a need for the configuration of a search space capable of supporting such a need and for PDCCH monitoring.

In a carrier aggregation system, a UE DL CC set is indicative of a set of DL CC that has been scheduled for UE to receive a PDSCH, and a UE UL CC set is indicative of a set of UL CCs that has been scheduled for UE scheduled to send a PUSCH. Furthermore, a PDCCH monitoring set is indicative of a set of at least one DL CC on which PDCCH monitoring is performed. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. A DL CC included in the PDCCH monitoring set may be configured to be always self-scheduled for a linked UL CC. Such a UE DL CC set, UE UL CC set and PDCCH monitoring set may be configured in a UE-specific, UE group-specific or cell-specific manner.

If cross-carrier scheduling has been deactivated, it means that a PDCCH monitoring set is always the same as a UE DL CC set. In such a case, indication, such as separate signaling for the PDCCH monitoring set, is not required. If cross-carrier scheduling has been activated, however, a PDCCH monitoring set may be defined within a UE DL CC set. That is, in order to schedule a PDSCH or a PUSCH for UE, an eNB sends a PDCCH through only the PDCCH monitoring set.

FIG. 8 shows an example of the structure of a subframe according to cross-carrier scheduling in a wireless communication system to which an embodiment of the present invention may be applied.

Referring to FIG. 8, 3 DL CCs are aggregated in a DL subframe for LTE-A UE. A DL CC "A" indicates a case where the DL CC has been configured as a PDCCH monitoring DL CC. If a CIF is not used, each DL CC may send a PDCCH for scheduling its own PDSCH without a CIF. In contrast, if a CIF is used through higher layer signaling, only one DL CC "A" may send a PDCCH for scheduling its own PDSCH or the PDSCH of another CC using a CIF. In this case, DL CCs "B" and "C" not configured as a PDCCH monitoring DL CC do not send a PDCCH.

Hybrid-Automatic Repeat and Request (HARQ)

In a mobile communication system, one eNB sends and receives data to and from a plurality of UEs in one cell/sector through a wireless channel environment.

In a system in which multiple carriers operate or a system operating in a form similar to the system, an eNB receives packet traffic over a wired Internet and sends the received packet traffic to UE using a predetermined communication method. In this case, it is a downlink scheduling that the eNB determines to send data to which UE using which frequency domain at which timing.

Furthermore, the eNB receives data from the UE using a predetermined communication method, demodulates the received data, and sends packet traffic through the wired Internet. It is an Uplink scheduling that the eNB determines to allow which UE to send uplink data using which frequency band at which timing. In general, UE having a better channel state sends and receives data using more time and more frequency resources.

FIG. 9 is a diagram illustrating a time-frequency resource block in a time frequency domain in a wireless communication system to which an embodiment of the present invention may be applied.

Resources in a system in which multiple carriers operate and a system operating in a form similar to the system may be basically divided into a time domain and a frequency domain. The resources may be defined as resource blocks. The resource block includes specific N subcarriers and specific M subframes or a predetermined time unit. In this case, N and M may be 1.

In FIG. 9, one square means one resource block, and one resource block use several subcarriers as one axis and a predetermined time unit as the other axis. In downlink, an eNB schedules one or more resource blocks for selected UE according to a predetermined scheduling rule, and sends data to the UE using allocated resource blocks. In uplink, an eNB schedules one or more resource blocks to selected UE according to a predetermined scheduling rule, and the UE sends data using the allocated resource in uplink.

After the scheduling and the data is transmitted, an error control method if a frame is lost or damaged includes an automatic repeat request (ARQ) method and a hybrid ARQ (HARQ) method of a more advanced form.

Basically, in the ARQ method, after one frame is transmitted, a transmission side waits for an acknowledgement message (ACK). A reception side sends an acknowledgement message (ACK) only when the frame is successfully received. If an error is generated in the received frame, the reception side sends a negative-ACK (NACK) message again and deletes information about the received frame having an error from a reception end buffer. When an ACK signal is received, a transmission side sends a subsequent frame. When a NACK message is received, the transmission side resends a corresponding frame.

Unlike in the ARQ method, in the HARQ method, if a received frame cannot be demodulated, a reception end sends a NACK message to a transmission end, but stores an already received frame in a buffer during a specific time and combines the stored frame with a previously received from when the corresponding frame is retransmitted, thereby increasing a success rate of reception.

Recently, the HARQ method more efficient than the basic ARQ method is widely used. Such an HARQ method includes several types. The HARQ method may be basically divided into synchronous HARQ and asynchronous HARQ depending on retransmission timing and may be divided into a channel-adaptive method and a channel-non-adaptive method depending on whether a channel state is incorporated into the amount of resources used upon retransmission.

In the synchronous HARQ method, when initial transmission fails, subsequent retransmission is performed by a system according to predetermined timing. That is, assuming that timing upon retransmission is performed every fourth time unit after an initial transmission failure, an eNB and UE do not need to be additionally notified of such timing because the timing has already been agreed between the eNB and the UE. In this case, if a data transmission side has received an NACK message, it retransmits a frame every fourth time unit until it receives an ACK message.

In contrast, in the asynchronous HARQ method, retransmission timing may be newly scheduled or may be performed through additional signaling. Timing when retransmission for a previously failed frame is performed is changed depending on several factors, such as a channel state.

In the channel-non-adaptive HARQ method, the modulation of a frame upon retransmission, the number of resource blocks, and adaptive modulation and coding (AMC) are performed as they have been predetermined upon initial transmission. In contrast, in the channel-adaptive HARQ method, the modulation of a frame upon retransmission, the number of resource blocks, and adaptive modulation and coding (AMC) are performed are changed depending on the state of a channel. For example, in the channel-non-adaptive HARQ method, a transmission side sends data using 6 resource blocks upon initial transmission and performs retransmission using 6 resource blocks upon subsequent retransmission in the same manner. In contrast, in the channel-adaptive HARQ method, although transmission has been performed using 6 resource blocks, retransmission is subsequently performed using resource blocks greater than or smaller than the 6 resources blocks depending on a channel state.

Four HARQ combinations may be performed based on such a classification, but a HARQ method that are used primarily includes an asynchronous and channel-adaptive HARQ method and a synchronous and channel-non-adaptive HARQ method.

The asynchronous and channel-adaptive HARQ method can maximize retransmission efficiency because retransmission timing and the amount of resources used are adaptively changed depending on the state of a channel, but has a disadvantage in that overhead is increased. Accordingly, the asynchronous and channel-adaptive HARQ method is not taken into consideration in common for uplink.

The synchronous and channel-non-adaptive HARQ method is advantageous in that overhead for timing for retransmission and resource allocation is rarely present because the timing for retransmission and the resource allocation have been predetermined within a system, but is disadvantageous in that retransmission efficiency is very low if such a method is used in a channel state that varies severely.

FIG. 10 is a diagram illustrating a resource allocation and retransmission process of the asynchronous HARQ method in a wireless communication system to which an embodiment of the present invention may be applied.

For example, in the case of downlink, after scheduling is performed and data is transmitted, ACK/NACK information is received from UE. Time delay is generated until next data is transmitted as shown in FIG. 10. The time delay is generated due to channel propagation delay and the time taken for data decoding and data encoding.

For such a delay period, a method for sending data using an independent HARQ process is used for blankless data transmission. For example, if the shortest cycle between next data transmission and subsequent data transmission is 7 subframes, data may be transmitted without a blank if 7 independent processes are placed in the 7 subframes.

An LTE physical layer supports HARQ in a PDSCH and a PUSCH and associated reception acknowledge (ACK) feedback in a separate control channel is transmitted.

In an LTE FDD system, if the LTE FDD system does not operate in MIMO, 8 stop-and-wait (SAW) HARQ processes are supported in uplink and downlink both in a constant round trip time (RTT) of 8 ms.

FIG. 11 is a diagram showing a downlink HARQ process in an LTE FDD system to which an embodiment of the present invention may be applied, and FIG. 12 is a diagram showing an uplink HARQ process in an LTE FDD system to which an embodiment of the present invention may be applied.

Each HARQ process is defined by a unique HARQ process identifier (HARQ ID) of a 3-bit size. A reception end (i.e., UE in a downlink HARQ process and an eNodeB in an uplink HARQ process) requires individual soft buffer allocation for the combination of retransmitted data.

Furthermore, for an HARQ operation, a new data indicator (NDI), a redundancy version (RV), and a modulation and coding scheme (MCS) field are defined within downlink control information. The NDI field is toggled whenever new packet transmission starts. The RV field indicates an RV selected for transmission or retransmission. The MCS field indicates an MCS level.

In an LTE system, a downlink HARQ process is an adaptive asynchronous method. Accordingly, downlink control information for an HARQ process is explicitly accompanied every downlink transmission.

In an LTE system, an uplink HARQ process is a synchronous method and may include an adaptive or non-adaptive method. The uplink non-adaptive HARQ scheme requires a preset RV sequence (e. g., 0, 2, 3, 1, 0, 2, 3, 1, . . . ) for consecutive packet transmission because it does not accompany the explicit signaling of control information. In contrast, in the uplink adaptive HARQ scheme, an RV is explicitly signaled. In order to minimize control signaling, uplink mode in which an RV (or MCS) is combined with another control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

An object of the limited buffer rate matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of UE, the code bit is transmitted in the virtual circular buffer (VCB) that may be stored in the HARQ soft buffer of the UE for all of the given TB (re)transmissions.

Coordinated Multi-Point Transmission and Reception (CoMP)

In accordance with the demand of LTE-advanced, CoMP transmission is proposed to enhance performance of a system.

CoMP is referred to as a scheme for two or more eNBs, (Access) Points or Cells cooperate with each other and communicate with UE in order to perform smoothly communication between a specific UE and an eNB, (Access) Point or Cell. The CoMP is also called co-MIMO, collaborative MIMO, network MIMO, and the like. It is anticipated that the CoMP will improve performance of UE positioned at a cell boundary and improve an average throughput of the cell (sector).

In this specification, an eNB, an access point, and a cell are used as the same meaning.

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in the cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a coordinated scheduling/beamforming (CS/CB) method.

In case of JP method, the data headed from each eNB that performs the CoMP to UE is transmitted to UE instantaneously and simultaneously, and the UE combines the signal from each of the eNBs so as to improve the reception performance. Meanwhile, in the case of the CS/CB, the data headed to UE is transmitted instantaneously through a single eNB, and the scheduling or beamforming is performed such that the interference exerted on another eNB by the UE becomes the minimum.

In the JP method, data may be used in each point (i.e, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

CA-Based CoMP Operation

In system subsequent to LTE, cooperative multi-point (CoMP) transmission may be implemented using a carrier aggregation (CA) function in LTE.

FIG. 13 is a diagram illustrating a carrier aggregation-based CoMP system in a wireless communication system to which an embodiment of the present invention may be applied.

FIG. 13 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and a neighboring eNB providing much interference allocates an SCell, so that Various DL/UL CoMP operations such as JT, CS/CB, and dynamic cell selection may be performed.

FIG. 13 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

UE Procedure for Receiving PDSCH

When UE detects a PDCCH of a serving cell on which a DCI format 1, 1A, 1B, 1C, 1D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

If not, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 3 illustrates a PDCCH and PDSCH configured by an SI-RNTI.

TABLE 3

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 4 illustrates a PDCCH and PDSCH configured by a P-RNTI.

TABLE 4

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 5 illustrates a PDCCH and PDSCH configured by an RA-RNTI.

TABLE 5

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,
UE does not receive a PDSCH RB transmitted in the antenna port 5 even in any subframe in which the number of OFDM symbols for a PDCCH having a common CP is 4.
If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.
UE does not receive a PDSCH RB transmitted in the antenna port 7 to which distributed VRB resource allocation has been assigned.
UE may skip the decoding of a transport block if it does not receive all of allocated PDSCH RBs. If the UE skips the decoding, a physical layer indicates that the transport block has not been successfully decoded for a higher layer.

In the case of the frame structure type 2,
UE does not receive a PDSCH RB transmitted in the antenna port 5 even in any subframe in which the number of OFDM symbols for a PDCCH having a common CP is 4.
If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.
If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.
If a common CP is configured, UE does not receive a PDSCH in the antenna port 5 in which distributed VRB resource allocation has been assigned within a special subframe in an uplink-downlink configuration #1 or #6.
UE does not receive a PDSCH transmitted in the antenna port 7 to which distributed VRB resource allocation has been assigned.
UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 6 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 6 illustrates a PDCCH and PDSCH configured by a C-RNTI.

TABLE 6

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
|  | DCI format 1 | UE-specific by a C-RNTI | a single antenna port, a port 0 |
| Mode 2 | DCI format 1A | common and UE-specific by a C-RNTI | transmit diversity |
|  | DCI format 1 | UE-specific by a C-RNTI | transmit diversity |
| Mode 3 | DCI format 1A | common and UE-specific by a C-RNTI | transmit diversity |
|  | DCI format 2A | UE-specific by a C-RNTI | large delay CDD or transmit diversity |
| Mode 4 | DCI format 1A | common and UE-specific by a C-RNTI | transmit diversity |
|  | DCI format 2 | UE-specific by a C-RNTI | closed-loop spatial multiplexing or transmit diversity |
| Mode 5 | DCI format 1A | common and UE-specific by a C-RNTI | transmit diversity |
|  | DCI format 1D | UE-specific by a C-RNTI | multi-user MIMO |
| Mode 6 | DCI format 1A | common and UE-specific by a C-RNTI | transmit diversity |
|  | DCI format 1B | UE-specific by a C-RNTI | closed-loop spatial multiplexing using a single transport layer |
| Mode 7 | DCI format 1A | common and UE-specific by a C-RNTI | If the number of PBCH antenna ports is 1, a single antenna port, a port 0 is used, and if not, transmit diversity |
|  | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
|  | DCI format 2B | UE-specific by a C-RNTI | dual layer transmission, ports 7 and 8 or a single antenna port, a port 7 or 8 |
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
|  | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 7 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfiglist." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 7 illustrates a PDCCH and PDSCH configured by an SPS C-RNTI.

TABLE 7

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
|  | DCI format 1 | UE-specific by a C-RNTI | a single antenna port, a port 0 |
| Mode 2 | DCI format 1A | common and UE-specific by a C-RNTI | transmit diversity |
|  | DCI format 1 | UE-specific by a C-RNTI | transmit diversity |
| Mode 3 | DCI format 1A | common and UE-specific by a C-RNTI | transmit diversity |
|  | DCI format 2A | UE-specific by a C-RNTI | transmit diversity |
| Mode 4 | DCI format 1A | common and UE-specific by a C-RNTI | transmit diversity |
|  | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
|  | DCI format 1 | UE-specific by a C-RNTI | a single antenna port, a port 5 |
| Mode 8 | DCI format 1A | common and UE-specific by a C-RNTI | a single antenna port, a port 7 |
|  | DCI format 2B | UE-specific by a C-RNTI | a single antenna port, a port 7 or 8 |
| Mode 9 | DCI format 1A | common and UE-specific by a C-RNTI | a single antenna port, a port 7 |
|  | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 8. The PDSCH corresponding to the PDCCH(s) is scrambling-initialized by the temporary C-RNTI.

Table 8 illustrates a PDCCH and a PDSCH configured by a temporary C-RNTI.

TABLE 8

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |
| DCI format 1 | UE-specific by a temporary C-RNTI | If the number of PBCH antenna ports is 1, a single antenna port, a port 0 is used, and if not, transmit diversity |

UE Procedure for PUSCH Transmission

UE is semi-statically configured through higher layer signaling so that it performs PUSCH transmission signaled through a PDCCH according to any one of two types of uplink transmission modes 1 and 2 defined in Table 9 below. If the UE is configured by a higher layer so that it decodes a PDCCH with CRC scrambled by a C-RNTI, the UE decodes the PDCCH according to a combination defined in Table 9 and sends the corresponding PUSCH. The PUSCH transmission corresponding to the PDCCH(s) and the PUSCH retransmission for the same transport block is scrambling-initialized by the C-RNTI. The transmission mode 1 is a default uplink transmission mode until an uplink transmission mode is assigned in the UE by higher layer signaling.

When UE is configured as the transmission mode 2 and receives a DCI format 0 uplink scheduling grant, the UE assumes that PUSCH transmission is related to a transport block 1 and a transport block 2 is disabled.

Table 9 illustrates a PDCCH and a PUSCH configured by a C-RNTI.

TABLE 9

| TRANS-MISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |
|  | DCI format 4 | UE-specific by a C-RNTI | closed-loop spatial multiplexing |

If UE is configured by a higher layer so that it decodes a PDCCH with CRC scrambled by a C-RNTI and also configured to receive a random access procedure started by a PDCCH order, the UE decodes the PDCCH according to a combination defined in Table 10 below.

Table 10 illustrates a PDCCH set as a PDCCH order for starting a random access procedure.

TABLE 10

| DCI FORMAT | SEARCH SPACE |
| --- | --- |
| DCI format 1A | common and UE-specific by a C-RNTI |

If UE is configured by a higher layer so that it decodes a PDCCH with CRC scrambled by an SPS C-RNTI, the UE decodes the PDCCH according to a combination defined in Table 11 below and sends a corresponding PUSCH. The PUSCH transmission corresponding to the PDCCH(s) and the PUSCH retransmission for the same transport block is scrambling-initialized by the SPS C-RNTI. PUSCH retransmission for the same transport block as the minimum transmission of a PUSCH without a corresponding PDCCH is scrambling-initialized by an SPS C-RNTI.

Table 11 illustrates a PDCCH and a PUSCH configured by an SPS C-RNTI.

TABLE 11

| TRANSMISSION MODE | DCI FORMAT | SEARCH SPACE | METHOD FOR SENDING PUSCH CORRESPONDING TO PDCCH |
| --- | --- | --- | --- |
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |

If UE is configured by a higher layer so that it decodes a PDCCH scrambled by a temporary C-RNTI regardless of whether the UE has been configured to decode a PDCCH with CRC scrambled by a C-RNTI, the UE decodes the PDCCH according to a combination defined in Table 12 and sends a corresponding PUSCH. The PUSCH corresponding to the PDCCH(s) is scrambling-initialized by the temporary C-RNTI.

If a temporary C-RNTI is set by a higher layer, PUSCH transmission corresponding to a random access response grant and PUSCH retransmission for the same transport block are scrambled by the temporary C-RNTI. If not, the PUSCH transmission corresponding to the random access response grant and the PUSCH retransmission for the same transport block are scrambled by a C-RNTI.

Table 12 illustrates a PDCCH configured by a temporary C-RNTI.

TABLE 12

| DCI FORMAT | SEARCH SPACE |
| --- | --- |
| DCI format 0 | common |

If UE is configured by a higher layer so that it decodes a PDCCH with CRC scrambled by a TPC-PUCCH-RNTI, the UE decodes the PDCCH according to a combination defined in Table 13 below. In Table 13, indication "3/3A" means that UE receives the DCI format 3 or a DCI format depending on a configuration.

Table 13 illustrates a PDCCH configured by a TPC-PUCCH-RNTI.

TABLE 13

| DCI FORMAT | SEARCH SPACE |
| --- | --- |
| DCI formats 3/3A | common |

If UE is configured by a higher layer so that it decodes a PDCCH with CRC scrambled by a TPC-PUSCH-RNTI, the UE decodes the PDCCH according to a combination defined in Table 14 below. In Table 14, indication "3/3A" includes that UE receives the DCI format 3 or a DCI format depending on a configuration.

Table 14 illustrates a PDCCH configured by a TPC-PUSCH-RNTI.

TABLE 14

| DCI FORMAT | SEARCH SPACE |
| --- | --- |
| DCI formats 3/3A | common |

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transmission/reception efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable user equipment (UE) to acquire a channel information in downlink (DL), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when an eNB transmits DL data. If UE receives the corresponding reference signal, the UE can perform channel estimation, thereby demodulating data. And, the corresponding reference signal should be transmitted in a data transmitted region.

5 types of downlink reference signals are defined.
  A cell-specific reference signal (CRS)
  A multicast-broadcast single-frequency network reference signal (MBSFN RS)
  A UE-specific reference signal or a demodulation reference signal (DM-RS)

A positioning reference signal (PRS)

A channel state information reference signal (CSI-RS)

One RS is transmitted in each downlink antenna port.

The CRS is transmitted in all of downlink subframe in a cell supporting PDSCH transmission. The CRS is transmitted in one or more of antenna ports 0-3. The CRS is transmitted only in $\Delta f=15$ kHz.

The MBSFN RS is transmitted in the MBSFN region of an MBSFN subframe only when a physical multicast channel (PMCH) is transmitted. The MBSFN RS is transmitted in an antenna port 4. The MBSFN RS is defined only in an extended CP.

The DM-RS is supported for the transmission of a PDSCH and is transmitted in antenna ports p=5, p=7, p=8 or p=7, 8, . . . , u+6. In this case, u is the number of layers which is used for PDSCH transmission. The DM-RS is present and valid for the demodulation of a PDSCH only when PDSCH transmission is associated in a corresponding antenna port. The DM-RS is transmitted only in a resource block (RB) to which a corresponding PDSCH is mapped.

If any one of physical channels or physical signals other than the DM-RS is transmitted using the resource element (RE) of the same index pair (k,l) as that of a RE in which a DM-RS is transmitted regardless of an antenna port "p", the DM-RS is not transmitted in the RE of the corresponding index pair (k,l).

The PRS is transmitted only in a resource block within a downlink subframe configured for PRS transmission.

If both a common subframe and an MBSFN subframe are configured as positioning subframes within one cell, OFDM symbols within the MBSFN subframe configured for PRS transmission use the same CP as that of a subframe #0. If only an MBSFN subframe is configured as a positioning subframe within one cell, OFDM symbols configured for a PRS within the MBSFN region of the corresponding subframe use an extended CP.

The start point of an OFDM symbol configured for PRS transmission within a subframe configured for the PRS transmission is the same as the start point of a subframe in which all of OFDM symbols have the same CP length as an OFDM symbol configured for the PRS transmission.

The PRS is transmitted in an antenna port 6.

The PRS is not mapped to RE (k,l) allocated to a physical broadcast channel (PBCH), a PSS or and SSS regardless of an antenna port "p."

The PRS is defined only in $\Delta f=15$ kHz.

The CSI-RS is transmitted in 1, 2, 4 or 8 antenna ports using p=15, p=15, 16, p=15, . . . , 18 and p=15, . . . , 22, respectively.

The CSI-RS is defined only in $\Delta f=15$ kHz.

A reference signal is described in more detail.

The CRS is a reference signal for obtaining information about the state of a channel shared by all of UEs within a cell and measurement for handover, etc. The DM-RS is used to demodulate data for only specific UE. Information for demodulation and channel measurement may be provided using such reference signals. That is, the DM-RS is used for only data demodulation, and the CRS is used for the two purposes of channel information acquisition and data demodulation.

The receiver side (i.e., terminal) measures the channel state from the CRS and feeds back the indicators associated with the channel quality, such as the channel quality indicator (CQI), the precoding matrix index (PMI), and/or the rank indicator (RI) to the transmitting side (i.e., an eNB). The CRS is also referred to as a cell-specific RS. On the contrary, a reference signal associated with a feed-back of channel state information (CSI) may be defined as CSI-RS.

The DM-RS may be transmitted through resource elements when data demodulation on the PDSCH is required. The terminal may receive whether the DM-RS is present through the upper layer and is valid only when the corresponding PDSCH is mapped. The DM-RS may be referred to as the UE-specific RS or the demodulation RS (DMRS).

FIG. 14 illustrates a reference signal pattern mapped to a downlink resource block pair in the wireless communication system to which an embodiment of the present invention may be applied.

Referring to FIG. 14, as a unit in which the reference signal is mapped, to the downlink resource block pair may be expressed by one subframe in the time domain×12 subcarriers in the frequency domain. That is, one resource block pair has a length of 14 OFDM symbols in the case of a normal cyclic prefix (CP) (FIG. 14(a)) and a length of 12 OFDM symbols in the case of an extended cyclic prefix (CP) (FIG. 14(b)). Resource elements (REs) represented as '0', '1', '2', and '3' in a resource block lattice mean the positions of the CRSs of antenna port indexes '0', '1', '2', and '3', respectively and resource elements represented as 'D' means the position of the DM-RS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (eNB). The RSs are transmitted based on maximum 4 antenna ports depending on the number of transmitting antennas of an eNB in the 3GPP LTE system (for example, release-8). The transmitter side has three types of antenna arrays of three single transmitting antennas, two transmitting antennas, and four transmitting antennas. For instance, in case that the number of the transmitting antennas of the eNB is 2, CRSs for antenna #1 and antenna #2 are transmitted. For another instance, in case that the number of the transmitting antennas of the eNB is 4, CRSs for antennas #1 to #4 are transmitted. The CRS pattern in one RB is shown in FIG. 14 when the transmission antenna of the eNB is 4.

When the eNB uses the single transmitting antenna, a reference signal for a single antenna port is arrayed.

When the eNB uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the eNB uses four transmitting antennas, reference signals for four transmitting antenna ports are arrayed using the TDM and/or FDM scheme. Channel information measured by a downlink signal receiving side (i.e., a terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule for mapping a CRS to a resource block is defined as below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. N_symb^DL represents the number of OFDM symbols in one downlink slot and N_RB^DL represents the number of radio resources allocated to the downlink, n_s represents a slot index and, N_ID^Cell represents a cell ID. mod represents an modulo operation. The position of the reference signal varies depending on the v_shift value in the frequency domain. Since v_shift depends on the cell ID (i.e., physical layer cell ID), the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DM-RS is described in more detail, the DM-RS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DM-RS for rank 1 beamforming is defined. The DM-RS for the rank 1 beamforming also means a reference signal for antenna port index 5.

A rule of mapping the DM-RS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and l indicate a subcarrier index and a symbol index, respectively, and p indicates an antenna port. N_sc^RB indicates the size of the resource block in the frequency domain and is expressed as the number of subcarriers. n_PRB indicates the number of physical resource blocks. N_RB^PDSCH indicates a frequency band of the resource block for the PDSCH transmission. n_s indicates the slot index and N_ID^cell indicates the cell ID. mod indicates the modulo operation. The position of the reference signal varies depending on the v_shift value in the frequency domain. Since v_shift depends on the cell ID (i.e., physical layer cell ID), the position of the reference signal has various frequency shift values according to the cell In LTE-A which has evolved from LTE, a system needs to be designed such that up to eight transmit (Tx) antennas can be supported on downlink. Accordingly, RSs for up to eight Tx antennas also need to be supported. Since only downlink RSs for up to four antenna ports have been defined in an LTE system, if an eNB has four to eight downlink Tx antennas in an LTE-A system, RSs for such antenna ports need to be additionally defined and designed. As RSs for up to eight Tx antenna ports, the aforementioned RS for channel measurement and RS for data demodulation need to be designed One important consideration in design of an LTE-A system is backward compatibility. That is, an LTE UE needs to properly operate and the system needs to support the same. RSs for up to eight Tx antenna ports need to be additionally defined in a time-frequency region in which a CRS defined in LTE is transmitted per subframe in the full band in terms of RS transmission. When an RS pattern for up to eight Tx antennas is added to the full band per subframe in an LTE-A system, like the CRS in LTE, RS overhead excessively increases.

Accordingly, RSs newly designed in LTE-A are classified into an RS for channel measurement for selecting an MCS, a PMI and the like (CSI-RS: Channel State Information-RS or Channel State Indication-RS) and an RS for demodulating data transmitted through eight Tx antennas (DM-RS: Data Demodulation-RS).

The CSI-RS is designed mainly for channel measurement, whereas the conventional CRS is used for channel measurement, handover measurement and data demodulation. Of course, the CSI-RS may also be used for handover measurement. Since the CSI-RS is transmitted only for the purpose of obtaining information about a channel state, the CSI-RS may not be transmitted per subframe, differently from the CRS. To reduce CSI-RS overhead, the CSI-RS is intermittently transmitted in the time domain.

For data demodulation, a DM-RS dedicated to a UE scheduled in the corresponding time-frequency region is transmitted. That is, a DM-RS of a specific UE is transmitted only in a region in which the UE is scheduled, that is, a time-frequency region in which data is received.

In LTE-A, an eNB needs to transmit CSI-RSs for all antenna ports. Since transmission of CSI-RSs for up to eight Tx antenna ports per subframe causes excessive overhead, the overhead is reduced by intermittently transmitting the CSI-RSs in the time domain instead of transmitting the same per subframe. That is, the CSI-RS can be periodically transmitted in a period corresponding to an integer multiple of one subframe or transmitted in a specific transmission pattern. Here, the transmission period or pattern of the CSI-RS can be configured by an eNB.

To measure CSI-RSs, a UE must know a transmission subframe index of a CSI-RS for each CSI-RS antenna port of a cell to which the UE belongs, a time-frequency position of a CSI-RS resource element (RE) in a transmission subframe, and information about a CSI-RS sequence.

In an LTE-A system, an eNB needs to transmit a CSI-RS for each of up to eight antenna ports. Resources used for transmission of CSI-RSs for different antenna ports need to be orthogonal. When an eNB transmits CSI-RSs for different antenna ports, the eNB can orthogonally allocate resources through FDM/TDM by mapping the CSI-RSs for the antenna ports to different REs. Alternatively, CSI-RSs can be transmitted according to CDM which maps CSI-RSs for different antenna ports to orthogonal codes.

When an eNB informs a UE belonging to the cell thereof of information about CSI-RSs, the eNB needs to inform the UE of information about a time-frequency to which a CSI-RS for each antenna port is mapped. Specifically, the information includes numbers of subframes in which CSI-RSs are transmitted, a CSI-RS transmission period, a subframe offset in which a CSI-RS is transmitted, the number of an OFDM symbol through which a CSI-RS RE of an antenna is transmitted, frequency spacing, and an offset or shift value of REs in the frequency domain.

CSI-RSs are transmitted through 1, 2, 4 or 8 antenna ports. Here, antenna ports p=15, p=15, 16, p=15, . . . , 18, p=15, . . . , 22 are used. CSI-RSs can be defined only for a subframe spacing of $\Delta f$=15 kHz.

Conditions for (k',l') (here, k' is a subcarrier index in a resource block and l' indicates an OFDM symbol index in a slot) and $n_S$ are determined according to a CSI-RS configuration shown in Table 15 or 16.

Table 15 shows (k',l') mapping from a CSI-RS configuration in a normal CP case.

TABLE 15

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 16 shows (k',l') mapping from a CSI-RS configuration in an extended CP case.

TABLE 16

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |

TABLE 16-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 13 | (6, 4) | 1 | | | | |
| | 14 | (1, 4) | 1 | | | | |
| | 15 | (0, 4) | 1 | | | | |
| Frame | 16 | (11, 1) | 1 | (11, 1) | 1 | (11, 1) | 1 |
| structure | 17 | (10, 1) | 1 | (10, 1) | 1 | (10, 1) | 1 |
| type 2 | 18 | (9, 1) | 1 | (9, 1) | 1 | (9, 1) | 1 |
| only | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Tables 15 and 16, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighbor cells may have different configurations to the maximum. In addition, the CSI-RS configuration may be divided into the case of being applied to both the FDD frame and the TDD frame and the case of being applied to only the TDD frame.

Based on Table 15 and Table 16, (k',l') and $n_S$ are determined according to the CSI-RS configuration, and time-frequency resource that each CSI-RS antenna port uses for transmitting the CSI-RS is determined.

FIG. 15 is a diagram illustrating the CSI-RS configuration in a wireless communication system to which the present invention may be applied.

FIG. 15(a) shows twenty CSI-RS configurations that are usable in the CSI-RS transmission through one or two CSI-RS antenna ports, and FIG. 15(b) shows ten CSI-RS configurations that are usable by four CSI-RS antenna ports. FIG. 15(c) shows five CSI-RS configurations that are usable in the CSI-RS transmission through eight CSI-RS antenna ports.

As such, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 15(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 15(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 15(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1 −1] is multiplied.

Referring to FIGS. 15(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

A UE presumes the zero power transmission for the REs (except the case of being overlapped with the RE that presumes the NZP CSI-RS that is configured by a high layer) that corresponds to four CSI-RS column in Table 15 and Table 16 above, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of (n_2 mod 2) in Table 15 and Table 16 above and the CSI-RS subframe configuration.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (s={15}, s={15,16}, s={17,18}, s={19,20} or s={21,22}) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; $T_{CSI-RS}$) for transmitting the CSI-RS and the subframe offset ($\Delta_{CSI-RS}$) are represented in Table 5 below.

Table 17 exemplifies the configuration of CSI-RS subframe.

TABLE 17

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 17, according to the CSI-RS subframe configuration ($I_{CSI-RS}$), the CSI-RS transmission period ($T_{CSI-RS}$) and the subframe offset ($\Delta_{CSI-RS}$) are determined.

The CSI-RS subframe configuration in Table 5 is configured as one of the 'SubframeConfig' field and the 'zeroTx-PowerSubframeConfig' field in Table 17 above. The CSI-RS subframe configuration may be separately configured for the NZP CSI-RS and the ZP CSI-RS.

The subframe including the CSI-RS satisfies Equation 15 below.

$$(10n_f+\lfloor n_s/2 \rfloor - \Delta_{CSI-RS}) \bmod T_{CSI-RS}=0 \quad \text{[Equation 15]}$$

In Equation 15, $T_{CSI-RS}$ represents the CSI-RS transmission period, $\Delta_{CSI-RS}$ represents the subframe offset value, $n_f$ represents the system frame number, and $n_s$ represents the slot number.

In the case of a UE to which transmission mode 9 is set for a serving cell, a single CSI-RS resource may be set to the UE. In the case of a UE to which transmission mode 10 is set for a serving cell, one or more CSI-RS resources may be set to the UE.

For each CSI-RS resource configuration, the following parameters may be set through high layer signaling.
 In the case that transmission mode 10 is set, the CSI-RS resource configuration identifier
 The number of CSI-RS ports
 The CSI-RS configuration (refer to Table 3 and Table 4)
 The CSI-RS subframe configuration ($I_{CSI-RS}$; refer to Table 5)
 In the case that transmission mode 9 is configured, the transmission power ($P_c$) for the CSI feedback
 In the case that transmission mode 10 is configured, the transmission power ($P_c$) for the CSI feedback with respect to each CSI process. When the CSI subframe sets $C_{CSI,0}$ and $C_{CSI,1}$ are set by a high layer for the CSI process, $P_c$ is set for each CSI subframe set of the CSI process.
 The pseudo-random sequence generator parameter ($n_{ID}$)
 In the case that transmission mode 10 is set, the QCL scrambling identifier (qcl-ScramblingIdentity-r11) for assuming the Quasi Co-Located (QCL) type B UE, the CRS port count (crs-PortsCount-r11), and the high layer parameter ('qcl-CRS-Info-r11') that includes the MBSFN subframe configuration list (mbsfn-Subframe-ConfigList-r11) parameter When the CSI feedback value obtained by a UE has the value in the range of [−8, 15] dB, $P_c$ is presumed by the ratio of the PDSCH EPRE for the CSI-RS EPRE. Herein, the PDSCH EPRE corresponds to the symbol in which the ratio of PDSCH EPRE for the CRS EPRE is $\rho_A$.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 15) or [16-27] set in the case of the extended CP (refer to Table 16) is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For the UE to which transmission mode 10 is configured, one or more Channel-State Information-Interference Measurement (CSI-IM) resource configuration may be set.

The following parameters may be configured for each CSI-IM resource configuration through high layer signaling.
 The ZP CSI-RS configuration (refer to Table 15 and Table 16)
 The ZP CSI-RS subframe configuration ($I_{CSI-RS}$; refer to Table 17)

The CSI-IM resource configuration is the same as one of the configured ZP CSI-RS resource configuration.

In the same subframe in a serving cell, the CSI-IM resource and the PMCH are not configured simultaneously.

For the UE to which transmission modes 1 to 9 are set, a ZP CSI-RS resource configuration may be set to the UE for the serving cell. For the UE to which transmission mode 10 is set, one or more ZP CSI-RS resource configurations may be set to the UE for the serving cell.

The following parameters may be configured for the ZP CSI-RS resource configuration through high layer signaling.
 The ZP CSI-RS configuration list (refer to Table 15 and Table 16)
 The ZP CSI-RS subframe configuration ($I_{CSI-RS}$; refer to Table 17)

In the same subframe in a serving cell, the ZP CSI-RS resource and the PMCH are not configured simultaneously.

Cross-Carrier Scheduling and E-PDCCH Scheduling

In the 3GPP LTE Rel-10 system, a cross-CC scheduling operation is defined as follows in a situation in which a plurality of component carriers (CCs)=(serving)cells) has been aggregated. One CC (i.e., scheduled CC) may be previously configured so that DL/UL scheduling is performed by only a specific one CC (i.e., scheduling CC) (i.e., so that a DL/UL grant PDCCH for a corresponding scheduled CC is received). Furthermore, the corresponding scheduling CC may basically perform DL/UL scheduling therefor. In other words, a search space (SS) for a PDCCH that schedules a scheduling/scheduled CC within a cross-CC scheduling relation may be fully present in the control channel region of the scheduling CC.

In the LTE system, an FDD DL carrier or TDD DL subframes, as described above, use the first n OFDM symbols of a subframe to send a PDCCH, a PHICH, and a PCFICH, that is, physical channels for sending various types of control information, and use the remaining OFDM symbols for PDSCH transmission. In this case, the number of symbols used for control channel transmission in each subframe is transferred to UE dynamically through a physical channel, such as a PCFICH or in a semi-static manner through RRC signaling. In this case, characteristically, an "n" value may be set to 1 symbol to a maximum of 4 symbols depending on subframe characteristics and system characteristics (e.g., FDD/TDD or a system bandwidth).

In an existing LTE system, a PDCCH, that is, a physical channel for DL/UL scheduling and the transmission of various types of control information, has a limit because it is transmitted through restricted OFDM symbols.

Accordingly, an enhanced PDCCH (i.e., an E-PDCCH) that is more freely multiplexed into a PDSCH using an FDM/TDM method may be introduced instead of a control channel transmitted through an OFDM symbol separated from a PDSCH like a PDCCH.

FIG. 16 is a diagram illustrating a PDCCH and E-PDCCHs in a wireless communication system to which an embodiment of the present invention may be applied.

Referring to FIG. 16, a legacy PDCCH (i.e., L-PDCCH) is transmitted in the first n OFDM symbols of a subframe, and E-PDCCHs are multiplexed into a PDSCH using an FDM/TDM method and transmitted.

Quasi Co-Located (QCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE can perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property can be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, UE can perform the detection/reception, channel estimation, and channel state report of a downlink reference signal through a QC/QCL assumption between antenna ports.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and $11^{th}$ OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

An eNB can deliver configuration information for measurement to a UE through higher layer signaling (e.g., RRC connection reconfiguration message).

The RRC connection reconfiguration message includes a 'radioResourceConfigDedicated' information element IE) and a 'measConfig' IE.

The 'measConfig' IE specifies measurement that needs to be performed by the UE and includes configuration information for intra-frequency mobility, inter-frequency mobility and inter-RAT mobility as well as measurement gap configuration.

Particularly, the 'measConfig' IE includes 'measObjectToRemoveList' indicating a list of measurement objects that will be excluded from measurement and 'measObjectToAddModList' indicating a list that will be newly added or modified. In addition, 'measObject' includes 'MeasObjectCDMA2000', 'MeasObjctEUTRA' 'MeasObjectGERAN' according to communication scheme 'RadioResourceConfigDedicated' IE is used to set up/modify/release a radio bearer, to change a MAC main configuration, to change a semi-persistent scheduling (SPS) configuration or to change a dedicated physical configuration.

'RadioResourceConfigDedicated' IE includes a 'measSubframePattern-Serv' field indicating a time domain measurement resource restriction pattern for serving cell measurement. In addition, 'RadioResourceConfigDedicated' IE includes 'measSubframeCellList' indicating neighbor cells to be measured by a UE and 'measSubframePattern-Neigh' indicating a time domain measurement resource restriction pattern for neighbor cell measurement.

A time domain measurement resource restriction pattern configured for a measurement cell (including the serving cell and a neighbor cell) can indicate at least one subframe per radio frame for RSRQ measurement. RSRQ measurement is not performed in subframe other than the subframe indicated by the time domain measurement resource restriction pattern configured for the measurement cell.

In this manner, a UE (e.g., a 3GPP Rel-10 UE) needs to measure RSRQ only in period set by a subframe pattern for serving cell measurement ('measSubframePattern-Serv') and a subframe pattern for neighbor cell measurement ('measSubframePattern-Neigh').

Although measurement of RSRP is not limited to measurement in such a pattern, it is desirable to measure RSRP only in such a pattern for accuracy requirement.

Measurements

Measurement performed by a UE for intra/inter-frequency mobility can be controlled using broadcast or dedicated control according to E-UTRAN.

In an RRC_IDLE state, the UE conforms to a measurement parameter defined for cell reselection specified according to E-UTRAN broadcast. Dedicated measurement control may be used for the RRC_IDLE state.

In an RRC_CONNECTED state, the UE conforms to a measurement configuration specified by RRC (e.g., UTRAN MEASUREMENT_CONTROL) delivered from E-UTRAN.

Intra-frequency neighbor (cell) measurement and inter-frequency neighbor (cell) measurement are defined as follows.

With respect to intra-frequency neighbor (cell) measurement, neighbor cell measurement performed by a UE when the current cell and a target cell operate at the same carrier frequency is intra-frequency measurement. The UE can perform such measurement without a measurement gap.

With respect to inter-frequency neighbor (cell) measurement, neighbor cell measurement performed by the UE when the current cell and a target cell operate at different carrier frequencies is inter-frequency measurement. The UE cannot perform such measurement without a measurement gap.

Whether a gap is supported for measurement may be determined by the capability and the current operating frequency of the UE.

The UE can determine whether measurement of a specific cell needs to be performed in a transmission/reception gap and whether a scheduler needs to know the necessity of a gap.

In the case of the same carrier frequency and cell bandwidth, intra-frequency measurement is performed and a measurement gap is not supported.

When a target cell and a current cell operate at the same carrier frequency and the bandwidth of the target cell is narrower than the bandwidth of the current cell, intra-frequency measurement is performed and a measurement gap is not supported.

When the target cell and the current cell operate at the same carrier frequency and the bandwidth of the target cell is wider than the bandwidth of the current cell, intra-frequency measurement is performed and a measurement gap is not supported.

When the target cell and the current cell operate at the different carrier frequencies, the bandwidth of the target cell is narrower than the bandwidth of the current cell and is included in the bandwidth of the current cell, inter-frequency measurement is performed and a measurement gap is supported.

When the target cell and the current cell operate at the different carrier frequencies and the bandwidth of the target cell is wider than the bandwidth of the current cell and the bandwidth of the current cell is included in the bandwidth of the target cell, inter-frequency measurement is performed and a measurement gap is supported.

In the case of different carrier frequencies and a non-overlapping bandwidth, inter-frequency measurement is performed and a measurement gap is supported.

A measurement gap pattern is configured and activated by RRC.

When CA is configured, the current cell refers to a serving cell in a configured serving cell set. Accordingly, intra/inter-frequency measurement may be defined as follows.

With respect to intra-frequency neighbor (cell) measurement, when one of serving cells in a configured set and a target cell operate at the same carrier frequency, neighbor cell measurement performed by a UE is intra-frequency measurement. The UE can perform such measurement without a measurement gap.

With respect to inter-frequency neighbor (cell) measurement, when a neighbor cell and a serving cell in a configured set operate at different carrier frequencies, neighbor cell measurement performed by the UE is inter-frequency measurement. The UE cannot perform such measurement without a measurement gap.

Method for Supporting Fast Carrier Switching

The present invention proposes a method through which a UE directly detects a specific signal (e.g., a preamble, a synchronization signal, a CRS, a CSI-RS or the like) through a process such as blind detection to recognize a TXOP (Transmission Opportunity) period or a reserved resource period (RRP) in a situation in which signals are transmitted and received through carriers of an unlicensed band.

In the specification, a period in which corresponding carrier resources are occupied/secured for transmission and reception of signals between an eNB and a UE through carriers of an unlicensed band is called RRP.

Here, the RRP may be defined as a single continuous period or defined as a set of continuous periods. For example, the RRP can be composed of a unit of symbols, slots, subframes or radio frames.

The term "eNB" described in the specification is interchangeably used with a remote radio head (RRH), an eNB, a transmission point (TP), a reception point (RP), a relay.

Proposed methods will be described on the basis of 3GPP LTE/LTE-A or convenience of description. However, the proposed methods can be applied to systems (e.g., UTRA) in addition to 3GPP LTE/LTE-A.

As an increasing number of communication devices requires larger communication capacity, efficient utilization of limited frequency bands becomes important in future wireless communication systems.

Accordingly, a method of using an unlicensed band, such as 2.4 GHz used in conventional Wi-Fi systems, or an unlicensed band, such as 5 GHz which is newly receiving attention, for traffic offloading in cellular communication systems such as LTE/LTE-A systems is under discussion.

Unlicensed bands are based on the assumption that wireless transmission and reception are performed through contention between communication nodes, and thus each communication node is required to perform channel sensing before transmitting a signal to confirm that other communication nodes do not transmit signals. This is called clear channel assessment (CCA). An eNB or a UE of LTE may need to perform CCA for signal transmission in unlicensed bands. Further, when an eNB or a UE of LTE/LTE-A transmits a signal, other communication nodes such as Wi-Fi need to perform CCA not to cause interference. For example, a CCA threshold is defined as −62 dBm for non-Wi-Fi signals and −82 dBm for Wi-Fi signals in Wi-Fi standards (801.11ac), which means that an STA or an AP does not transmit a signal when a signal other than Wi-Fi signals is received at −62 dBm or higher such that interference does not occur. In a Wi-Fi system, an STA or an AP can perform CCA and transmit a signal when a signal exceeding the CCA threshold is not detected for 4 μs or longer.

The present invention considers a situation in which signals are transmitted and received through carriers of an unlicensed band which is not guaranteed to be exclusively used by a specific system. For example, the present invention is applied to a situation shown in FIG. 17.

FIG. 17 illustrates carrier aggregation in an unlicensed band according to an embodiment of the present invention.

As shown in FIG. 17, an eNB can transmit a signal to a UE or the UE can transmit a signal to the eNB in a situation of carrier aggregation of a component carrier (CC) (or cell) of a licensed band and a CC (or cell) of an unlicensed band.

In the following, a licensed band is referred to as "LTE-A band" and an unlicensed band is referred to as "LTE-U band" or "Ucell" for convenience of description.

In the following description of embodiments of the present invention, a situation in which a UE is configured to perform wireless communication through CC0 (PCell) as one or more component carriers in a licensed band and through one or more CCs in an unlicensed band is assumed for convenience of description of the method proposed by the present invention.

It is assumed that wireless communication is performed through CC0 (PCell) as a CC in a licensed band and through at least one of CC1, CC2 and CC3 in an unlicensed band for convenience of description of the present invention.

Here, a carrier of a licensed band may be interpreted as a primary component carrier (PCC or PCell) and a carrier of an unlicensed band may be interpreted as a secondary component carrier (SCC or SCell), for example.

Accordingly, a system considered in the present invention can be called a license assisted access (LAA) system for convenience. LAA refers to a technology for aggregating an LTE licensed band and an unlicensed band using carrier aggregation (CA).

However, methods proposed in the present invention are not limited to the LAA system. Methods proposed in the present invention can be extended and applied to a situation in which multiple licensed bands and multiple unlicensed bands are used through carrier aggregation. Furthermore, the methods may be extended and applied even when signals are transmitted and received between an eNB and a UE only through an unlicensed band, or signals are transmitted and received between an eNB and a UE through carrier aggregation of only unlicensed bands or only licensed bands. The methods proposed in the present invention can be extended and applied to not only the 3GPP LTE system but also a system having different characteristics.

To perform transmission and reception with a UE, for example, using SCells CC1, CC2 and CC3 along with a PCell CC0 in a conventional carrier aggregation (CA) system, the UE needs to include a maximum of four independent RF chains corresponding to CC0, CC1, CC2 and CC3.

Here, an eNB previously configures and provides RRC signaling related to "SCell addition" to the UE for CC1, CC2 and CC3 and provides activation signaling/deactivation signaling to indicate whether any SCell is actually activated through a MAC message.

That is, the eNB provides activation/deactivation through MAC layer signaling per CC in a manner of transmitting a control signal to operate the UE. An operation of the UE based on standards when an activation message is received will be described below.

When the UE receives an activation command for an SCell in subframe n, the corresponding operation, except the operations below, the operation is applied no faster than subframe n+8 and no later than the minimum requirement.
Operation related to CSI report
Operation related to SCell deactivation timer ('sCellDeactivationTimer') associated with SCell
The aforementioned operations are applied to subframe n+8.

When the UE receives a deactivation command for an SCell in subframe n or an SCell deactivation timer ('sCellDeactivationTimer') for the SCell expires in subframe n, the corresponding operation, except the operation related to CSI report, is applied no later than the minimum requirement. The CSI report related operation is applied in subframe n+8.

The present invention proposes a method by which a UE that does not include a plurality of RF chains available in SCells, differently from the aforementioned example, can perform fast carrier switching (in an LTE-U band). This UE may be a UE manufactured at a relatively low cost, for example, a UE including two RF chains for a PCell and a single activated SCell.

In addition, the method for fast carrier switching according to the present invention can also be applied to a case in which a UE capable of applying multiple RF chains for SCells uses only two RF chains for a PCell and a single activated SCell for the purpose of battery saving and the like.

The present invention will be described based on a case in which only a single RF chain (or a single transmitter/receiver) can be applied to an SCell for implementation of inexpensive UEs.

In the description of the present invention, "RF chain" refers to a module/component (transmitter/receiver) that can perform transmission/reception in a separate CC. For example, in the case of a different IF (Intermediate Frequency) module, the RF chain means a unit of an FFT (Fast Fourier Transform) processing at a time. That is, the RF chain can be implemented in various manners.

The aforementioned characteristic of UE operation may be interpreted as a characteristic that two or more SCells cannot be simultaneously activated.

Consequently, to support the UE operation in the LTE-U band based on the conventional CA standard, only SCell addition related RRC signaling for a specific CC is provided to the UE in advance and then the CC is activated through MAC signaling because only one of CC1, CC2 and CC3 can be activated in any period and thus SCell addition related RRC signaling for multiple CCs cannot be delivered.

For example, if the activated CC is CC2, when CC2 needs to be switched to CC3, operations of deactivating CC2, newly delivering SCell addition related RRC signaling for CC3 (i.e., RRC reconfiguration message) and then activating CC3 through MCA signaling can be applied.

Such conventional operations have a problem that RRC level latency (e.g., tens to hundreds of ms) due to RRC reconfiguration is inevitably generated whenever SCell switching is performed. Furthermore, if SCells are used in an unlicensed band as in an LAA system, channel occupation by CCA is possible in the corresponding LTE U band and thus loading situations for CCs may be considerably different or relatively frequently changed. Accordingly, carrier switching (or cell switching) for the LTE UE band can frequently occur compared to that in a licensed band.

Therefore, there is a need for a technology for eliminating or remarkably reducing the aforementioned latency due to the conventional operation.

In the following description of the present invention, a CC (or cell) refers to a DL CC and/or a UL CC.

In the following description of the present invention, carrier switching (or cell switching) refers to switching of fully activated CCs (or cells) or switching of targets of a receiver (or reception module) of a UE.

To solve the aforementioned problem, in the present invention, a UE may notify an eNB of at least one piece of capability related content having different properties, which will be described below, as capability information of the UE reported to the eNB in advance (e.g., during initial access of the UE) through specific capability signaling.

FIG. 18 illustrates a cell activation/deactivation method according to an embodiment of the present invention.

Referring to FIG. 18, the UE transmits, to the eNB, UE capability information including information about component carriers (CCs) (or cells) supportable by the UE (S1801).

Here, the information about CCs (or cells) supportable by the UE may include information about CCs that can be fully activated by the UE and information about CCs that can be partially activated by the UE.

Here, the information about CCs that can be fully activated and the information about CCs that can be partially activated may be configured in separate formats or in a single format and included in the UE capability information.

The information about CCs (or cells) supportable by the UE will be described in more detail.

1. Information about CCs that can be Fully Activated

Information indicating the number of (SCell) CCs that can be simultaneously "fully activated" (i.e., the number of CCs that can be simultaneously fully activated, for example, N CCs) and/or information related to a list of N specific bands (or CC list)

Here, "full activation" may be equivalent to "capability" in a CA system of the current standard (e.g., release-12). In other words, all normal SCell operations available in the CA system (e.g., SRS transmission in an SCell, CQI/PMI/RI/PTI reporting (i.e., CSI reporting) with respect to an SCell, PDCCH monitoring in an SCell, PDCCH monitoring for an SCell, uplink/downlink data transmission and reception, etc.) can be applied to a "fully activated" CC.

In addition, operations that need to be performed by a UE for a "fully activated" CC may include CSI reporting and specific RRM measurement/reporting with respect to the CC, downlink reception of a PDSCH and/or uplink transmission in a UL band associated with the CC if the UL band exists.

Further, operation elements that can be performed by a UE in a "fully activated" CC may be predefined or configured in the UE (e.g., through an RRC message).

The UE can transmit the number (i.e., N) of CCs that can be simultaneously fully activated to the eNB.

For example, in the above-described example of an inexpensive UE (that is, a UE including two RF chains for a PCell and a single activated SCell), N may be 1 (for SCells).

The UE may transmit N pieces of band list information to the eNB.

For example, the UE may associate the band list information with information about a list of bands that can be "partially activated" which will be described in 2 below to notify the eNB of a corresponding band (e.g., {CC1} or {band1}). Such information may be capability signaling for a plurality of candidate combinations for another available band combination.

2. Information about CCs that can be Partially Activated

Information about the number of (SCell) CCs that can be simultaneously "partially activated" (i.e., the number of CCs that can be simultaneously partially activated, e.g., M CCs) and/or information about a list of M specific bands (or CC list)).

Here, "partial activation" may be limited to specific operations (e.g., CSI reporting, RRM measurement/reporting and the like) among operations that can be performed by a UE in the case of "full activation" (e.g., normal SCell operations) and/or include additional operations.

The UE may transmit the number (i.e., M) of CCs that can be simultaneously partially activated to the eNB.

In the above-described example of an inexpensive UE (that is, a UE including two RF chains for a PCell and a single activated SCell), M may be 3 (for SCells) in order to support technology related to fast carrier switching considered in the present invention.

For example, all CC1, CC2 and CC3 are partially activated such that CSI reporting for a specific CC among CC1, CC2 and CC3 can be performed, and downlink reception of a PDSCH/data may be performed only for a specific fully activated CC corresponding to N=1.

In addition, the UE may notify the eNB of information about the list of M bands, for example, in the form of {CC1, CC2, CC3} (or {band1, band2, band3}).

Additional restriction may be predefined in the form of M≥N with respect to the aforementioned parameters of the number N of CCs that can be simultaneously fully activated and the number M of CCs that can be simultaneously partially activated or may be set in the UE (e.g., through an RRC message). In this case, the UE needs to transmit the capability signaling to the eNB only when the restriction condition is satisfied.

While the UE capability signaling described above in 1 and 2 may be mapped to separate capability signaling indexes (and/or separate message containers) and delivered to the eNB, the information of 1 and the information of 2 may be loaded in a single message format and delivered to the eNB.

A case in which the information of 1 and the information of 2 are configured into a single message format will be described.

1) For example, the aforementioned information of 1 and 2 can be configured as follows.

{CC0, CC1 (full/partial), CC2 (partial), CC3 (partial)},
{CC0, CC1 (partial), CC2 (full/partial), CC3 (partial)},
{CC0, CC1 (partial), CC2 (partial), CC3 (full/partial)}

An indicator indicating that a corresponding CC (or band) has which characteristic among full activation and/or partial activation may be signaled along with an identifier of the CC (or band) in the aforementioned form.

In the above example, CC0 that does not include a full activation indicator and/or partial activation indicator refers to a CC having conventional CC (or band) characteristics (that is, CC supporting only activation/deactivation), and the eNB can set CC0 to a PCell. CCx (full/partial) refers to a CC (or band) having the aforementioned full activation and partial activation characteristics.

In addition, in the above example, CC1, CC2 and CC3 can be simultaneously partially activated, and only one (i.e., CC1, CC2 or CC3) of CC1, CC2 and CC3 can be fully activated in a specific period.

2) As another example, the aforementioned information of 1 and 2 may be configured as follows.

{CC0, CC1 (full), CC2 (partial), CC3 (partial)},
{CC0, CC1 (partial), CC2 (full), CC3 (partial)},
{CC0, CC1 (partial), CC2 (partial), CC3 (full)}

An indicator indicating that a corresponding CC (or band) has which characteristic among full activation or partial activation may be signaled along with an identifier of the CC (or band) in the aforementioned form. Here, CCx (full) can be defined as a CC basically having the partial activation function.

Furthermore, in the above example, CC0 that does not include a full activation indicator or partial activation indicator refers to a CC having conventional CC (or band) characteristics (that is, CC supporting only activation/deactivation), and the eNB can set CC0 to a PCell.

Accordingly, CC1, CC2 and CC3 can be simultaneously partially activated, and only one (i.e., CC1, CC2 or CC3) of CC1, CC2 and CC3 can be fully activated in a specific period as in the above example.

3) As another example, the aforementioned information of 1 and 2 may be configured as follows.

{CC0, CC1, CC2 (partial), CC3 (partial)},
{CC0, CC1 (partial), CC2, CC3 (partial)},
{CC0, CC1 (partial), CC2 (partial), CC3}

An indicator indicating whether a corresponding CC (or band) is a CC (or band) having the partial activation characteristics may be signaled along with an identifier of the CC (or band) in the aforementioned form. Here, a CC (or band) corresponding to "full activation" does not have an additional indicator.

In this case, a CC that does not include a partial activation indicator refers to a CC having the conventional CC (or band) characteristics (i.e., CC supporting only activation/deactivation) or a CC that can be full activated.

Accordingly, when CC0 is configured to a PCell, CC1, CC2 and CC3 can be simultaneously partially activated, and only one (i.e., CC1, CC2 or CC3) of CC1, CC2 and CC3 can be fully activated in a specific period. Also, when CC1 is configured to a PCell, CC0, CC2 and CC3 can be simultaneously partially activated, and only one (i.e., CC0, CC2 or CC3) of CC0, CC2 and CC3 can be fully activated in a specific period. Furthermore, the same applies to a case in which CC2 or CC3 is set to a PCell.

Upon reception of the UE capability signaling from the UE, the eNB transmits signaling related to SCell addition and "partial activation" or "full activation" signaling in consideration of the UE capability signaling. This will be described below with reference to the attached drawing.

FIG. 19 illustrates a cell activation/deactivation method according to an embodiment of the present invention.

FIG. 19, the eNB transmits a message related to SCell addition to the UE (S1901).

Here, the SCell addition related message is an RRC message (e.g., an RRC Connection Reconfiguration message) which can be delivered to the UE.

In addition, the SCell addition related message can be transmitted through a PCell.

As described above, when the eNB receives capability signaling from the UE as in the example shown in FIG. 18, the eNB needs to provide RRC signaling related to SCell addition, which is not against a capability characteristic combination of the UE, when delivering the RRC signaling. Here, the UE does not expect a case in which the eNB does not provide such RRC signaling and this case can be regarded as an error case.

Here, an SCell added on the basis of the SCell addition related message may be in a deactivation state by default starting when the UE has completed receiving the SCell addition related message. That is, when an SCell is added, the SCell can be initially deactivated.

Further, the SCell added on the basis of the SCell addition related message may be in a "partial activation" state by default from when the UE has completed receiving the SCell addition related message. That is, when an SCell is added, the SCell can be initially partially activated. In this case, an additional identifier or similar information may also be provided in S1901 such that the UE can recognize that "partial activation" is possible by default.

Additionally/alternatively, the number of CCs that can be "fully activated" (for a specific period) from among SCells added on the basis of the SCell addition related message is x, and an additional identifier or similar information may also be provided in S1901 such that the UE can recognize that only x CCs can be fully activated (for the specific period). By transmitting such information, the number of CCs that can be simultaneously "fully activated", transmitted by the UE through capability signaling, can be confirmed by the eNB.

For example, when the number of CCs (for SCells) that can be simultaneously fully activated is N=1 and the number of CCs (for SCells) that can be simultaneously partially activated is M=3, a case in which the eNB receives UE capability signaling with respect to the following CC (or band) combinations is assumed.

{CC0, CC1 (full/partial), CC2 (partial), CC3 (partial)},
{CC0, CC1 (partial), CC2 (full/partial), CC3 (partial)},
{CC0, CC1 (partial), CC2 (partial), CC3 (full/partial)}

Here, the UE can be linked to the eNB using CC0 as a PCell. {CC1, CC2, CC3} can be SCell targets and the eNB can provide RRC signaling related to SCell addition for {CC1, CC2, CC3} to the UE. Alternatively, the eNB can provide SCell addition related RRC signaling for a list of {CC1, CC2, CC3}.

Here, an additional identifier or similar information by which the UE can recognize that {CC1, CC2, CC3} can be "partially activated" by default may be provided along with the RRC signaling.

Additionally/alternatively, N=1 and thus only one of {CC1, CC2, CC3} can be "fully activated" (in a specific period), and an additional identifier or similar information by which the UE can recognize that only one CC can be fully activated may be additionally provided.

In such a situation, {CC1, CC2, CC3} may be in a deactivation state by default from when the UE has completed receiving the SCell addition related RRC signaling.

Thereafter, the eNB may transmit a message related to full activation or partial activation to the UE per CC (or for a specific CC group) (S1902).

When the UE receives the message related to full activation for a specific CC (or CC group), the UE fully activates the CC (or CC group).

On the other hand, when the UE receives the message related to partial activation for a specific CC (or CC group), the UE partially activates the CC (or CC group).

The full activation related message or the partial activation related message may be delivered through dynamic signaling (e.g., DCI) or MAC signaling (e.g., a MAC control element (CE) command).

Furthermore, the full activation related message or the partial activation related message may be transmitted through a PCell.

As described above, an SCell added on the basis of the SCell addition related message may be in a deactivation state by default from when the UE has completed receiving the SCell addition related RRC signaling. In this case, the eNB can transmit the full activation or partial activation related message to the UE per CC (or for a specific CC group).

On the other hand, the SCell added on the basis of the SCell addition related message may be in a "partial activation" state by default from when the UE has completed receiving the SCell addition related RRC signaling. In this case, the eNB can transmit the full activation related message to the UE for a CC corresponding to a full activation target.

Thereafter, the eNB may transmit a full deactivation or partial deactivation related message to the UE per CC (or for a specific CC group) (S1903).

The full deactivation related message or the partial deactivation related message may be delivered through dynamic signaling (e.g., delivered as deactivation information or partial deactivation information through DCI) or MAC signaling (e.g., a MAC CE command).

Further, the full deactivation related message or the partial deactivation related message may be transmitted through a PCell.

1) First, when the UE receives a "partial deactivation" related message for CCx, the UE performs at least one of the following operations:

The UE falls back CCx to a state in which only the "partial activation" related message has been received. That is, the UE partially activates CCx.

Accordingly, the UE performs only operation (e.g., CSI reporting and/or RRM measurement/reporting) with respect to a state in which CCx has been partially activated without being fully activated for CCx.

An additional message such as the "partial deactivation" related message may not be defined for the operation of partially activating CCx.

That is, if the "partial activation" related message is delivered while CCx is in a full activation state, the UE recognizes the "partial activation" related message as a message indicating fallback to instruct the UE to perform only operation (e.g., CSI reporting and/or RRM measurement/reporting) with respect to a state in which CCx has been partially activated and operates on the basis of the message.

2) If the UE receives the "full deactivation" related message (or deactivation related message) for CCx, the UE performs at least one of the following operations:

The UE can recognize the message as full deactivation of CCx like conventional SCell deactivation.

An additional message such as the "full deactivation" related message may not be defined for operation of fully deactivating CCx. That is, for this operation, a conventional SCell deactivation related message may be delivered. In this case, the UE can fully deactivate CCx.

The aforementioned "full deactivation" related message or the conventional SCell deactivation related message may be received when CCx is currently in a partial activation state or in a full activation state. That is, when the UE receives the "full deactivation" related message or the conventional SCell deactivation related message with respect to CCx, the UE can fully deactivate CCs irrespective of the state of CCx.

Alternatively, a procedure for receiving the "full deactivation" related message or the conventional SCell deactivation related message only in a partial activation state may be predefined or configured in the UE (e.g., through an RRC message). That is, for full deactivation of CCx, a procedure for falling back from a full activation state to a partial activation state (e.g., through a partial (de)activation related message) and then fully deactivating CCx in the partial activation state can be predefined or configured in the UE (e.g., through an RRC message).

An operation of the UE for a CC (or SCell) in a "partial activation" state or "full activation" state will be described.

A. For CCx in a "partial activation" state, the UE may perform at least one of the following operations.

This may correspond to a case in which the UE has received a "partial activation" related message for CCx (e.g., in a deactivation state or a full deactivation state after reception of an SCell addition related message), a case in which the UE has received a "partial deactivation" related message for CCx (e.g., in a full activation state) or a case in which an SCell added on the basis of the SCell addition related message is initially in a "partial activation" state.

1) The UE measures a CSI-RS (and CSI-IM) through a CSI process configured for CCx and initiates a CSI report related operation set in association therewith.

Periodic CSI Reporting (P-CSI Reporting)

When the UE receives the "partial activation" related message (or SCell to addition related message or "partial deactivation" related message) in an n-th subframe, the UE can perform P-CSI reporting from the (n+k)-th subframe. Here, a specific value k may be additionally predefined or set in the UE (e.g., through an RRC message).

For CSI measurement with respect to CCx for P-CSI reporting, an additional "measurement gap" which will be described below may be set.

In the present invention, "measurement gap" refers to configuration with respect to operations for a UE in order to perform a specific measurement (e.g., CSI measurement and/or RRM measurement) of a different CC. That is, the UE switches a target of a receiver (or reception module) from a specific activated CC to a CC corresponding to a measurement target and performs measurement for a measurement gap period, and then switches the receiver to the activated CC before the measurement gap period expires. As a result, the activated CC experiences service interruption during the measurement gap period.

The measurement gap may be set as a periodic form, and information about the start point of the measurement gap may be dynamically indicated in the form of "dynamic measurement gap" (e.g., through DCI or MSC CE), similarly to description below.

Here, reporting of a CSI measurement result may be performed through an uplink resource of the PCell.

As described above, the measurement gap may be set as a period form (e.g., period and offset).

Alternatively, automatic (or implicit) configuration of the measurement gap in association with transmission times (or timing of the transmission times) (e.g., subframes) of a specific reference signal (e.g., CSI-RS) for CSI measurement and interference measurement resources such as CSI-IM in CCx and/or a CSI reporting time (e.g. subframe) may be predefined or configured in the UE (e.g., through an RRC message).

For example, it is assumed that the CSI-RS transmission time is t1 [subframe], the CSI-IM transmission time is t2 [subframe], reporting through uplink resources (e.g., uplink resources of the PCell) associated with CCx is configured, and the CSI reporting time is t3 [subframe].

Here, automatic (or implicit) configuration of the measurement gap to a specific period on the basis of (or before and/or after) the CSI-RS transmission time may be predefined or configured in the UE (e.g., through an RRC message).

That is, the measurement gap can be automatically (or implicitly) configured to the period from t1−m1 [subframe] to t1+m2 [subframe]. For example, m1=m2=2.

That is, time m1 (e.g., m1=2) may be predefined or configured in the UE (e.g., through an RRC message) in consideration of a time required for the UE to switch and tune to CCx. In addition, time m2 (e.g., m2=2) may be predefined or configured in the UE (e.g., through an RRC message) in consideration of a time required for the UE to switch and tune to the previous CC.

In other words, such time may be predefined in standards or configured in individual UEs through RRC signaling.

Furthermore, the UE may additionally notify the eNB of such values through specific capability signaling. In this case, the eNB may set values (i.e., m1 and/or m2) received from the UE to the UE or set changed values to the UE.

As described above, automatic (or implicit) setting of the measurement gap to a predetermined period on the basis of (before or after) a CSI-IM transmission time may be predefined or configured in the UE (e.g., through an RRC).

In the aforementioned example, the measurement gap can be automatically (or implicitly) configured to a period from t2−m1 [subframe] to t2+m2 [subframe].

In addition, when CSI reporting through uplink resources associated with CCx is configured, automatic (or implicit) setting of the measurement gap to a predetermined (previous) period on the basis of a CSI reporting time may be predefined or configured in the UE (e.g., through an RRC message).

In the aforementioned example, the measurement gap can be automatically (or implicitly) configured to a period from t3−m1 [subframe] to t3+m2 [subframe].

When measurement gap periods generated (or calculated) under the aforementioned conditions overlap, a union of the periods is obtained to automatically (implicitly) configured (or maintain) a longer measurement gap period.

To minimize service interruption for an activated cell (e.g. PCell) by minimizing the measurement gap, it is desirable to align the resource transmission times (reference times for calculation of the measurement gap). For example, it is desirable to align reference times t1 and t2.

In addition, for example, the parameter values such as m1 and m2 in the above example may be set to different values for the reference times t1, t2 and t3.

Aperiodic CSI Reporting (A-CSI Reporting)

A DCI field configuration and RRC parameter setting related to A-CSI triggering, which need to be applied when DCI related to A-CSI triggering is directly transmitted to CCx, may be configured separately from a field configuration and RRC parameter setting when DCI related to A-CSI triggering is transmitted from another CC (e.g., PCell). In other words, for the PCell and an SCell in a partial activation state or for an SCell in a full activation state and an SCell in a partial activation state, independent A-CSI triggering DCI fields can be configured and A-CSI related RRC parameters can be set.

Related configuration information may be previously provided to the UE or provided along with a corresponding partial activation related message to the UE.

As a UE operation when corresponding A-CSI triggering is transmitted in a t-th subframe through DCI, when a CSI reference resource timing is (t+d1)-th subframe (e.g., d1=0 in FDD) in the conventional case, a new operation of recognizing a (t+d2)-th subframe as a CSI reference resource timing as a separate reference timing may be defined or configured in the UE (e.g., through an RRC message).

For example, d2=1 or d2=2. The reason for delaying the reference resource timing to the future timing by d2 subframe than when the A-CSI triggering is transmitted is as follows. For CSI measurement by the UE in CCx, a predetermined time is required to set a specific separate "measurement gap" and to move a transmission/reception RF chain in fully activated CCy to CCx and to tune to CCx because CCx is in a partial activation state. Here, the value D2 may be predefined or configured in the UE (e.g., through an RRC message) in consideration of a time at which the UE finishes decoding of the A-CSI triggering DCI.

In definition of CSI reference resources according to current LTE/LTE-A standards, subframe timing corresponding to "n−n_CQI_ref" is determined as reference resources in the time domain according to a value n_CQI_ref determined for a specific condition in the following form. In addition, a maximum CQI that does not exceed a BLER (Block Error Rate) of 10% when PDSCH transmission in the reference resource is assumed, and an RI and a PMI assumed to obtain the CQI are reported together as CSI.

In addition, a gap between an A-CSI triggering time and an A-CSI reporting time may need to be wider than a conventional gap X ms (e.g., X=4) due to a delay. Accordingly, X1 ms (e.g., X1=6 or X1=8) instead of X ms may be additionally defined or set in the UE (e.g., through an RRC message).

Furthermore, A-CSI related uplink grant timing may be newly defined and applied. For example, a timing (e.g., 6 to 8 subframes), which is different from a timing at which the UE transmits an uplink signal in an (n+4)-th subframe when an uplink grant is transmitted in an n-th subframe and the eNB transmits ACK/NACK through a PHICH in an (n+8)-th subframe in FDD, may be separately defined or set in the UE (e.g., through an RRC message). Here, separate application of different timings to the (A-CSI) triggering DCI and uplink grant DCI may be predefined or set in the UE (e.g., through an RRC message). For example, a timing corresponding to 4 subframes can be set in the case of uplink grant DCI, whereas a timing corresponding to 6 or 8 subframes can be set in the case of A-CSI triggering DCI.

For this operation, a "measurement gap" for CSI measurement may be predefined or set in the UE (e.g., through an RRC message) separately from the conventional "measurement gap" ("measurement gap" for RRM measurement for a cell that does not support full/partial activation). In addition, the "measurement gap" for CSI measurement may be defined as the same as a "measurement gap" for RRM measurement for an SCell in a partial activation state or configured in the UE, or defined or set in the UE (e.g., through an RRC message) separately from the "measurement gap" for RRM measurement.

More characteristically, the additional "measurement gap" for CSI measurement may not have a fixed period, and automatic (or implicit) setting of the measurement gap to a predetermined period on the basis of (after) A-CSI reporting triggering timing when A-CSI reporting for CSI measurement for the partially activated specific CCx is triggered may be predefined or configured in the UE (e.g., through an RRC message).

For example, when A-CSI reporting is triggered in a t-th subframe, the measurement gap for CSI measurement can be automatically (or implicitly) configured to a period from a (t+t1)-th subframe to a (t+t2)-th subframe on the basis of the triggering time.

In other words, such an additional "measurement gap" can be implicitly determined in association with a specific A-CSI triggering message (e.g., DCI) transmission time. For example, t1=1 and t2=4. In this case, the UE interrupts transmission/reception in CCy over a total of four subframes after a subframe in which the A-CSI triggering is received and performs CSI measurement in CCx. In addition, when CSI reporting is configured in uplink resources associated with CCx, the UE performs CSI reporting using the uplink resources.

A case in which the RS (e.g., CSI-RS) or CSI-IM for CSI measurement is not present in a specific "measurement gap (or window)" may be generated irrespective of the aforementioned P-CSI reporting or A-CSI reporting (because the eNB can perform transmission only when a CCA result in a corresponding CC corresponds to "channel idle" in an LAA environment, for example). In this case, the UE can repeat operation of returning to previous measurement gaps (or windows), regard a subframe in which the most recent CSI measurement RS (e.g., CSI-RS) and/or CSI-IM appear as a reference resource timing and derive CSI.

In addition, to prevent excessive returning to previous time (which may cause excessive CSI aging), a value related to a specific maximum valid time period may be predefined or configured in the UE (e.g., through RRC signaling). Here, the valid time value may be determined as a value in the absolute time unit (e.g., a value in ms, a value in units of subframe, or the like). Alternatively, the valid time value may be determined as D measurement windows from previous ones to the latest one.

Alternatively, when the UE does not receive a valid CSI-RS (and/or CSI-IM) in the corresponding measurement window, execution of an operation for notifying the eNB of this fact may be defined or set in the UE (e.g., through RRC signaling).

For example, feedback of conventional OOR (out-of-range) signaling at a CSI reporting time may be defined or set in the UE (e.g., through RRC signaling). Alternatively, signaling defined separately from OOR may be delivered to the eNB at a time other than the CSI reporting time.

A determination condition for "CSI-IM is not received" may be defined as a condition that other associated signals (e.g., a preamble, RS, etc.) have not been successfully received/detected or set in the UE (e.g., through RRC signaling). For example, when the eNB informs the UE that no signal will be transmitted in a specific subframe through DCI (because the eNB can perform transmission only when a CCA result in a corresponding CC corresponds to "channel idle" in an LAA environment, for example), the UE can determine that "CSI-IM has not been received" if the subframe corresponds to a subframe in which CSI-IM appears. Furthermore, when the UE blind detects an RS (e.g., CRS) in order to detect the initial subframe occupied by the eNB in the corresponding CC in the LAA environment, the UE can determine that "CSI-IM has not been received" if the initial subframe from which the UE has not detected the RS corresponds to a subframe in which CSI-IM appears.

Alternatively, since the network can recognize the fact that an RS or CSI-IM has not been transmitted in the corresponding measurement window, the eNB may appropriately process/correct a CSI measurement result reported by the UE If the UE does not perform excessive averaging of measurement results. To this end, the eNB may set a value D' such that the UE performs averaging within D' measurement windows (e.g., D'=1, D=5 or the like) from previous ones to the latest one.

Alternatively, in operation related to automatic (or implicit) setting of a measurement gap associated with the A-CSI trigger, the RS (e.g., CSI-RS) and CSI-IM for the CSI measurement is transmitted when the eNB securely occupies a channel according to a CCA result of CCx corresponding to a measurement target, and the A-CSI triggering can be transmitted along with the RS and CSI-IM to the UE. Accordingly, there is no case in which the CSI-RS or CSI-IM does not appear in a measurement window during A-CSI triggering. In this case, the aforementioned additional proposed operations may be restrictively applied to only CSI measurement operation related to periodic CSI reporting.

configuration related to the additional measurement window proposed in the present invention may be signaled to the UE (through a CC in a licensed band previously designated or set through signaling) through an additional dynamic indication (e.g., different DCI or DCI fields) for indicating the setting.

Here, if additional DCI (or an additional DCI field) for this purpose is designed, for example, monitoring of the additional DCI by the UE even when a specific CCx indicated by the additional DCI (or DCI field) is not currently (full) activated may be defined or set in the UE (e.g., through RRC signaling). Here, CCx may be a partially activated or deactivated CC or a CC that is not selected through carrier selection, as in the aforementioned examples.

Such operations may be applied to setting of P-CSI and A-CSI related measurement windows. More characteristically, the operations may be limited to the purpose of signaling an A-CSI triggering based CSI measurement valid window (i.e., a CSI measurement averaging period).

2) The UE initiates specific RRM measurement and reporting (e.g., inter-frequency RSRP and RSRQ) for CCx according to an operation rule predetermined or set in the UE.

That is, the UE may separately perform RRM measurement and reporting on the basis of an RRC configuration defined in the current standard irrespective of RRM measurement and reporting for CCx has an inter-frequency form or an intra-frequency form.

However, for a specific CCx to which "partial activation" state is applied, the "partial activation" related message is recognized as triggering initiation of specific inter/inter-frequency RRM measurement and reporting operation and thus the UE may perform a predetermined operation related thereto.

Here, RRM measurement result reporting may be performed on the uplink resources (e.g., uplink resources of the PCell) associated with the CCx.

As described above, according to an embodiment of the present invention, CSI measurement and reporting are performed in a partially activated CC. Although data is not transmitted in the partially activated CC, CSI measurement and reporting are performed in the CC and thus the eNB can acquire channel state information about the CC and use the channel state information to determine whether to fully activate the CC. In addition, since the eNB knows the channel state information when fully activating the CC, the eNB can determine a suitable modulation and coding scheme (MCS) to perform effective data transmission and reception.

B. The UE can perform at least one of the following operations for CCx in a "full activation" state.

This corresponds to a case in which the UE receives a "full activation" related message with respect to CCx.

All functions executable in a conventional activated SCell, such as CSI reporting and specific RRM measurement/reporting with respect to the corresponding CC, downlink reception of a PDSCH and/or uplink transmission in a UL band associated with the CC when the UL band is present, can be activated. Furthermore, a new enhanced operation may be added.

A constraint condition that CCx for which the "full activation" related message has been received should be a CC that has been "partially activated" may be defined or configured in the UE. In this case, the UE can consider the fact that the "full activation" message is not valid as an error case when the "full activation" related image is received for a CC that has not been "partially activated".

Alternatively, the "full activation" related message may be defined as being able to be delivered even when the corresponding CCx has not been "partially activated" or configured in the UE. In this case, the UE can recognize that operations corresponding to full activation as well as operations corresponding to partial activation can be performed for a CC for which the "full activation" related message has been received.

When the above-described operations are used, the following operations can be generated as exemplary operations of the aforementioned inexpensive UE.

It is assumed that CC0 operates as a PCell and the UE has received SCell addition related RRC signaling from the eNB for {CC1, CC2, CC3} on the basis of capability signaling (M=3). In addition, it is assumed that all of {CC1, CC2, CC3} may be in a partial activation state, and information indicating that only one (N=1) of {CC1, CC2, CC3} can be fully activated (in a specific period) is delivered through the SCell addition related RRC signaling. Furthermore, it is assumed that all of {CC1, CC2, CC3} are initially deactivated when an SCell is added.

a) Subsequently, the UE receives a "partial activation" message from the eNB for CC1 and CC3. That is, CC1 and CC3 are switched to a partial activation state but CC2 remains in the deactivation state.

Activation/deactivation state per CC is as follows.
<CC1: partial, CC2: deactivation, CC3: partial>

In this case, the UE can perform CSI reporting for partially activated CC1 and CC3.

Here, when A-CSI triggering is delivered to the UE, the UE performs CSI measurement for CC1 and CC3 in the aforementioned additional measurement gap (that is, switches a receiver (or target of a reception module) from CC0 corresponding to the PCell to CC1 or CC3 in the measurement gap and performs CSI measurement) and performs CSI reporting according to a defined rule. In addition, the UE can perform CSI measurement for CC1 and CC3 in the additional measurement gap for P-CSI reporting, as described above.

Furthermore, the UE can perform RRM measurement for CC1 and CC3 as described above.

b) Thereafter, the UE receives a "full activation" related message for CC3 from the eNB. That is, CC1 is in a partial activation state and CC2 still remains in the deactivation state, but CC3 is switched to a full activation state.

Activation/deactivation state per CC is as follows.

<CC1: partial, CC2: deactivation, CC3: full>

Accordingly, additional SCell transmission/reception are normally initiated through CC3 and thus the UE can receive data not only from the PCell but also from CC3 to obtain throughput and capacity improvement effects.

In addition, the UE additionally performs CSI reporting periodically or aperiodically for CC1. CSI measurement and reporting operations are intermittently maintained because a specific available CC may be frequently changed on the basis of statistics of channel sensing result, particularly, in an LAA environment, and CC1 is in an available state at a high rate.

c) Subsequently, when the eNB intends to perform fast "SCell handover" of the UE to CC1 because CC3 is frequently busy (or occupied) by another communication device (e.g., a wireless communication device of a Wi-Fi system) from a CCA result, the eNB transmits, to the UE, a message for switching CC1 to a full activation state along with a message (e.g., a partial (de)activation message) for switching CC3 to a partial activation state, and the UE receives the messages. That is, CC1 switches to a full activation state, CC2 still remains in the deactivation state and CC3 switches to a partial activation state.

Activation/deactivation state per CC is as follows.

<CC1: full, CC2: deactivation, CC3: partial>

Accordingly, SCell transmission/reception is normally initiated through CC1 instead of CC3 and the UE performs only (periodic/aperiodic) CSI measurement and reporting operations for CC3.

In addition, the UE can perform RRM measurement for CC3 as described above.

d) Then, when availability of CC3 decreases, the eNB transmits a message for deactivating CC3 and the UE receives this message. Accordingly, only CC1 in a full activation state is used for transmission and reception. That is, CC1 is in a full activation state and CC2 and CC3 switch to a deactivation state.

<CC1: full, CC2: deactivation, CC3: deactivation>

When the eNB newly delivers SCell addition related RRC signaling to the UE for various reasons such as movement of the UE to other areas, RRC reconfiguration may occur. In this case, operations similar to the aforementioned operations can be newly applied on the basis of updated RRC configuration.

Although CC0 is the PCell and {CC1, CC2, CC3} correspond to a band list of SCell targets in the above description, the present invention is not limited thereto.

That is, a "CC group" composed of one or more CCs may be configured, some CCs in each group may be partially activated, and only some CCs from among CC that can be partially activated may be fully activated.

For example, {CC4, CC5, CC6} may be applied as an additional pair (or CC group) in addition to the above-described example as a band list corresponding to additional SCell targets.

In other words, the UE can deliver capability signaling indicating that only one of {CC1, CC2, CC3} can be fully activated as N=1 to the eNB and, simultaneously, deliver capability signaling indicating that only one of {CC4, CC5, CC6} can be fully activated as N=1 to the eNB.

In such a case, some of {CC1, CC2, CC3} may be partially activated and CC2, for example, may be fully activated and, simultaneously, some of {CC4, CC5, CC6} may be partially activated and CC4, for example, may be fully activated. This means that the UE previously delivers information representing that three RF chains can be simultaneously applied through capability signaling. In the above example, normal SCell transmission/reception can be performed in a state that CC0, CC2 and CC4 are simultaneously fully activated.

That is, as described above, a specific "CC group" such as {CC1, CC2, CC3} or {CC4, CC5, CC6} can be formed, some CCs in the CC group can be partially activated, and only some (e.g., N=1) CCs of the partially activated CCs can be fully activated.

According to another embodiment for applying the key proposal of the present invention, the UE can support fast carrier switching in the following manner without applying the aforementioned UE capability signaling in the new form, that is, without special additional/modified CA capability signaling. That is, the procedure of FIG. 18 may not be performed. In other words, even when the UE operates using a capacity signaling method similar to the conventional CA method such as transmitting the same CA combination capability as the conventional one to the eNB, the following embodiments can be provided.

A case of a UE capable of CA of two CCs in a specific band (or a band combination) (e.g., a case in which the UE transmits capability signaling about a band combination of CC1 and CC2 to an eNB) will be exemplified for convenience of description.

1) The eNB can set CA of CC1 and CC2 for the UE. That is, CA can be set only for CC1 and CC2 as indicated by capability signaling transmitted by the UE.

However, CSI measurement and/or reporting periods may be previously set for CC3 and CC4 or aperiodic CSI triggering may be performed.

The eNB can set CSI measurement, and an RS (e.g., CSI-RS) and/or a reporting period related to CSI measurement for CC3 and CC4 through RRC signaling (e.g., an SCell addition related RRC message, additional RRC signaling, or the like), as described above. In this case, a measurement gap for P-CSI measurement and reporting may be set as described above.

In addition, related information such as an RRC parameter related to A-CSI reporting may be previously configured through RRC signaling such that the eNB can perform aperiodic CSI triggering. Here, A-CSI triggering may be transmitted in a set CC (i.e., CC1 or CC2). Furthermore, even in this case, a measurement gap for A-CSI measurement and reporting may be set as described above.

The UE may interrupt reception in CC1 and CC2 in a period necessary for CSI measurement and/or reporting with respect to CC3 or CC4 and perform CSI measurement and/or reporting in CC3 or CC4. Alternatively, the eNB may deactivate CC1 and CC2 at CSI measurement and/or reporting time for CC3 and CC4 and re-activate CC1 and CC2 at a time when CSI measurement and/or reporting for CC3 and CC4 is terminated.

Furthermore, even in this case, a measurement gap related to periodic or aperiodic CSI measurement may be set as described above.

2) This method ensures "restriction of the number of CCs that can be simultaneously activated to B (5 the number of set CCs) for the UE". That is, the eNB can transmit, to the UE, an indication indicating that a maximum of B CCs is to activated in a specific period while setting CA for A CCs. Here, B may be determined on the basis of specific capability signaling reported by the UE or signaled to the UE by the eNB.

For example, the eNB configures CA of CC1, CC2, CC3 and CC4 for the UE (A=4 in this case). Here, the eNB can ensure layer 1 (L1)/layer 2 (L2) activation of a maximum of B CCs in a specific period (or specific time) for the UE. This is determined on the basis of specific UE capability reported by the UE or determined by the eNB and signaled to the UE through RRC signaling.

The UE performs CSI measurement and reporting only for B activated CCs.

Alternatively, predefined specific CSI reporting can be immediately initiated for a specific CC for which an activation related message has been transmitted. For example, the UE can recognize that an A-CSI trigger will be automatically delivered through a specific uplink resource (e.g., PUSCH resource) defined/configured in advance for such a purpose when the specific CC is activated. This is because the eNB may not have CSI reporting related information other than RRM reporting information with respect to the corresponding CC.

Here, the UE can maintain downlink synchronization and/or channel tracking at a predetermined level even for CA cells (e.g., CC3 and CC4) beyond the capability transmitted thereby. Alternatively, maintaining downlink synchronization and/or channel tracking at a specific level or higher may be predefined because CCs may be activated at any time through fast carrier switching as in the operation according to the present invention even if the CCs are currently deactivated.

Here, a maximum number "L" of CCs for which each UE can maintain downlink synchronization and/or channel tracking (e.g., L=A, L=A=4 in this example) can be signaled to the eNB through specific capability signaling or additional signaling.

Alternatively, several UE classes for such operation may be predefined. In addition, various capability related parameters (e.g., N, M, etc.) proposed in the present invention as well as the value L may be predefined per UE class. In this case, a UE can signal, to the eNB, a UE class to which the UE belongs from among predefined UE classes.

Furthermore, parameters related to the value L may be fixed according to a specific standard. For example, all UEs implemented according to the standard need to have the aforementioned downlink synchronization and/or channel tracking capability according to the value L, and individual UEs may be capable of handling different numbers of CCs.

In addition, CCs that have been deactivated although CA has been configured therefor (e.g., CC3 and CC4) and an operation of performing no RRM (e.g., inter-frequency/intra-frequency) measurement and reporting for the CCs may be defined or configured in the UE (e.g., through RRC signaling).

In another embodiment proposed in the present invention, for fast carrier switching, setting of a common periodic CSI reporting mode and/or report resources for specific CCs (e.g., CC1, CC2 and CC3 in the above example) may be predefined or configured in the UE (e.g., through RRC signaling). When a specific CC from among the CCs is partially activated or fully activated, the UE may be configured to perform CSI feedback through the set report resources.

Accordingly, common report resources can be used and thus network overhead is reduced. When the UE is operated to report only one of the specific CCs, it is possible to apply fast carrier switching while increasing resource utilization efficiency through the aforementioned setting.

General Apparatus to which an Embodiment of the Present Invention May be Applied FIG. 20 illustrates a block diagram of a wireless communication apparatus according to an embodiment of the present invention.

Referring to FIG. 20, the wireless communication system includes an eNB 2010 and a plurality of pieces of UE 2020 located within the area of the eNB 2010.

The eNB 2010 includes a processor 2011, memory 2012, and a radio frequency (RF) unit 2013. The processor 2011 implements the functions, processes and/or methods proposed in FIGS. 1 to 19. The layers of a wireless interface protocol may be implemented by the processor 2011. The memory 2012 is connected to the processor 2011 and stores various pieces of information for driving the processor 2011. The RF unit 2013 is connected to the processor 2011 and transmits and/or receives a radio signal.

The UE 2020 includes a processor 2021, memory 2022, and an RF unit 2023. The processor 2021 implements the functions, processes and/or methods proposed in FIGS. 1 to 19. The layers of a wireless interface protocol may be implemented by the processor 2021. The memory 2022 is connected to the processor 2021 and stores various pieces of information for driving the processor 2021. The RF unit 2023 is connected to the processor 2021 and transmits and/or receives a radio signal.

The memory 2012, 2022 may be inside or outside the processor 2011, 2021 and connected to the processor 2011, 2021 by various well-known means. Furthermore, the eNB 2010 and/or the UE 2020 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

While examples in which the cell activation/deactivation method in the wireless communication system according to the present invention is applied to 3GPP LTE/LTE-A have been described, the present invention is applicable to various wireless communication systems in addition to 3GPP LTE/LTE-A.

The invention claimed is:

1. A method for activating/deactivating a secondary cell (SCell) by a user equipment (UE) in a wireless communication system supporting carrier aggregation, the method comprising:
receiving, from an evolved NodeB (eNB), an SCell addition message for adding a plurality of SCells;
partially activating one or more first SCells when a partial activation related message for the one or more first SCells among the plurality of SCells added based on the SCell addition message is received from the eNB;
fully activating one or more second SCells when a full activation related message for the one or more second SCells among the plurality of SCells added based on the SCell addition message is received from the eNB;
performing only channel state information (CSI) measurement and/or radio resource management (RRM) measurement of the partially activated one or more first SCells for a handover;
performing a handover from a specific SCell in the second SCells to a specific SCell in the first SCells; and
switching the specific SCell in the first SCells from being partially activated to being fully activated,
wherein normal SCell operations are applied to the one or more second SCells and only some of the normal SCell operations are applied to the one or more first SCells, and
wherein the plurality of SCells is configured to use a same CSI reporting mode and a same CSI reporting resource.

2. The method of claim 1, wherein a measurement gap for the CSI measurement is configured.

3. The method of claim 2, wherein a measurement gap for periodic CSI measurement is implicitly configured in association with a subframe of a reference signal for the CSI measurement, a subframe of a CSI-interference measurement (CSI-IM) resource or a CSI reporting subframe.

4. The method of claim 3, wherein, when the measurement gap does not include the reference signal or the CSI-IM resource for the CSI measurement, an out-of-range (OOR) is transmitted to the eNB when CSI reporting is performed.

5. The method of claim 2, wherein a measurement gap for aperiodic CSI measurement is implicitly configured in association with a subframe in which downlink control information (DCI) including triggering for aperiodic CSI measurement is transmitted.

6. The method of claim 2, wherein, when the measurement gap does not include a reference signal or a CSI-IM resource for the CSI measurement, a subframe of a reference signal or a subframe of a CSI-interference measurement (IM) resource for a previous CSI measurement is used as a reference resource for the CSI measurement.

7. The method of claim 1, wherein the plurality of SCells are initially deactivated or partially activated when added.

8. The method of claim 7, wherein the one or more second SCells have been partially activated before the full activation related message for the one or more second SCells is received.

9. The method of claim 1, further comprising partially activating the one or more second SCells when a partial activation related message or a partial deactivation related message for the second one or more SCells is received from the eNB.

10. The method of claim 1, further comprising deactivating the one or more first SCells or the one or more second SCells when an SCell deactivation or full deactivation related message for the one or more first SCells or the one or more second SCells is received from the eNB.

11. The method of claim 1, further comprising transmitting, to the eNB, a capability related message including the number of component carriers (CCs) that can be simultaneously partially activated by the UE, a list of the CCs, and the number of CCs that can be fully activated in the list.

12. The method of claim 1, wherein the one or more second SCells are included in the one or more first SCells.

13. A user equipment (UE) for activating/deactivating a secondary cell (SCell) in a wireless communication system supporting carrier aggregation, the UE comprising:
a transceiver to transmit and receive radio signals; and
a processor configured to:
control the transceiver to receive an SCell addition message for adding a plurality of SCells from an eNB;
partially activate one or more first SCells when a partial activation related message for the one or more first SCells among the plurality of SCells added based on the SCell addition message is received from the eNB;
fully activate one or more second SCells when a full activation related message for the one or more second SCells among the plurality of SCells added based on the SCell addition message is received from the eNB;
perform only channel state information (CSI) measurement and/or radio resource management (RRM) measurement of the partially activated one or more first SCells for a handover;
perform the handover from a specific SCell in the second SCells to a specific SCell in the first SCells; and
switch the specific SCell in the first SCells from being partially activated to being fully activated,
wherein normal SCell operations are applied to the one or more second SCells and only some of the normal SCell operations are applied to the one or more first SCells, and
wherein the plurality of SCells is configured to use a same CSI reporting mode and a same CSI reporting resource.

* * * * *